(12) United States Patent
Cincotti

(10) Patent No.: US 7,412,116 B2
(45) Date of Patent: Aug. 12, 2008

(54) OPTICAL DEVICE FOR SIMULTANEOUSLY GENERATING AND PROCESSING OPTICAL CODES

(75) Inventor: Gabriella Cincotti, Rome (IT)

(73) Assignee: Universita' Degli Studi "Roma Tre", Rome (IT)

( * ) Notice: Subject to any disclaimer, the term of this patent is extended or adjusted under 35 U.S.C. 154(b) by 0 days.

(21) Appl. No.: 10/584,689

(22) PCT Filed: Dec. 30, 2003

(86) PCT No.: PCT/IT03/00879

§ 371 (c)(1),
(2), (4) Date: Nov. 28, 2006

(87) PCT Pub. No.: WO2005/064834

PCT Pub. Date: Jul. 14, 2005

(65) Prior Publication Data

US 2007/0147734 A1   Jun. 28, 2007

(51) Int. Cl.
G02F 1/01 (2006.01)
H04B 10/12 (2006.01)
H03M 1/00 (2006.01)

(52) U.S. Cl. .............. 385/1; 385/31; 385/39; 385/50; 398/141; 398/153; 398/165; 398/166; 341/13; 341/14; 341/137

(58) Field of Classification Search ............. 385/1
See application file for complete search history.

(56) References Cited

U.S. PATENT DOCUMENTS 6,314,220 B1 * 11/2001 Mossberg et al. ............. 385/37

(Continued)

FOREIGN PATENT DOCUMENTS

EP    1 115 222    7/2001

(Continued)

OTHER PUBLICATIONS

Lam Cedric F et al: "Experimental Demonstration of Spectrally Encoded Optical CDMA Systems Using Mach-Zehnder Encoder Chains" Confernce on Lasers and Elctro-Optics. Cleo '98. Techincal Digest. Conference Edition. San Francisco CA, May 3-8, 1998, OSA Techincal Digest Series, vol. 6, New York, NY . . . .

(Continued)

*Primary Examiner*—Frank G Font
*Assistant Examiner*—Ryan Lepisto
(74) *Attorney, Agent, or Firm*—Young & Thompson

(57) ABSTRACT

The invention relates to an optical device, apt to generate and process optical codes at least one wavelength, comprising P inputs s, with $1 \leq s \leq P$, and $P \geq 1$, and N outputs k, with $1 \leq k \leq N$ and $N \geq 1$, characterized in that it is apt to simultaneously generate and process $N_c \geq 2$, made of C chips with time interval $\tau$, with $C \geq 2$, characterized in that the transfer function $T_{sk}(f)$ from the input s to the output k satisfies the following formula: where: $F_v$ is a transfer function of an optical filter, for $v=0, 1 \ldots, V-1$, $a_v$ is a constant value, for $v=0, 1, \ldots, V-1$ $S_{sk}$ is an integer number ($S_{sk} \in Z$), $N_k$ is a constant value, for $k=2, \ldots N$, and V is a positive integer number with $1 \geq V \geq \log_2 N$. The invention further relates to a set of optical codes, apt to be generated, in particular, by such optical device, and to networks and apparatus comprising such optical device.

41 Claims, 14 Drawing Sheets

U.S. PATENT DOCUMENTS

| | | | |
|---|---|---|---|
| 6,628,864 B2 * | 9/2003 | Richardson et al. | 385/37 |
| 6,865,344 B1 * | 3/2005 | Johnson et al. | 398/77 |
| 2001/0010739 A1 * | 8/2001 | Takiguchi et al. | 385/15 |

FOREIGN PATENT DOCUMENTS

| | | |
|---|---|---|
| EP | 1 309 116 | 5/2003 |

OTHER PUBLICATIONS

Min S-S et al: "Time-Wavelength Hybrid Optical CDMA System With Tunable Encoder/Decoder Using Switch and Fixed Delay-Line" Optics Communications, North-Holland Publishing Co. Amsterdam, NL, vol. 216, No. 4-6, Feb. 15, 2003, pp. 335-342 . . . .

* cited by examiner

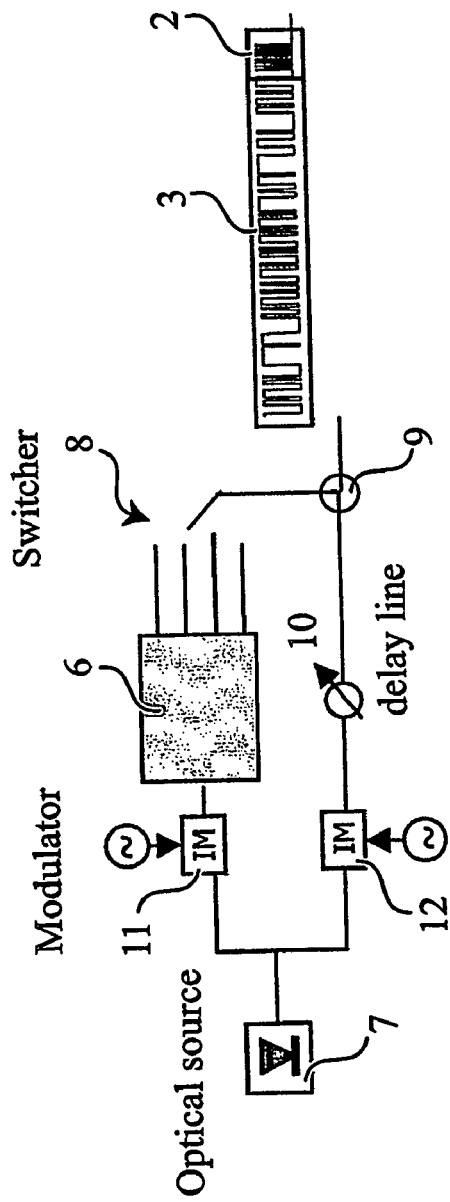
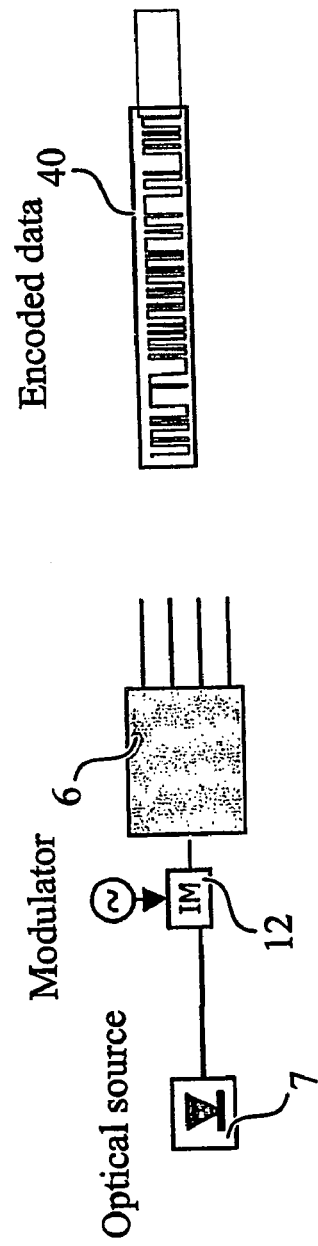
Fig. 4a
Fig. 4b

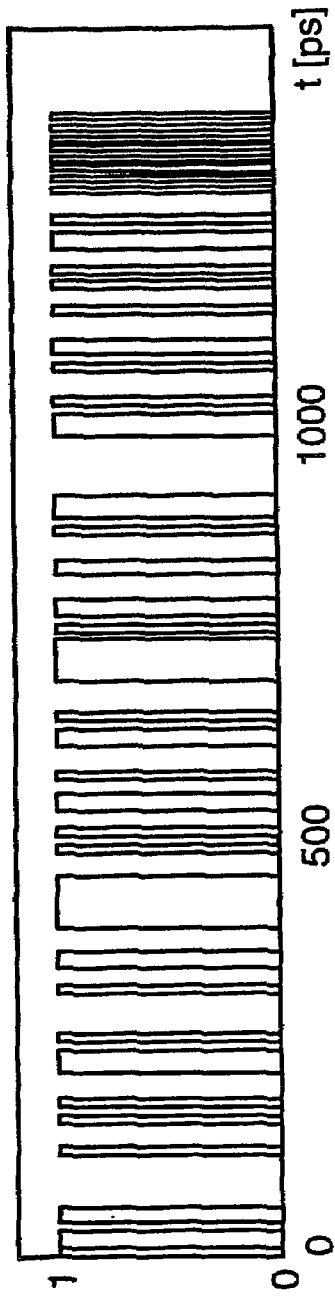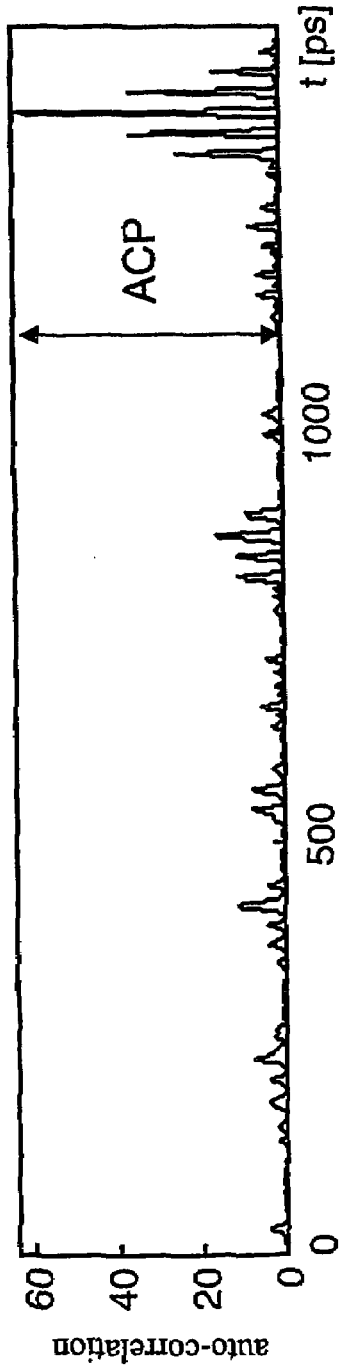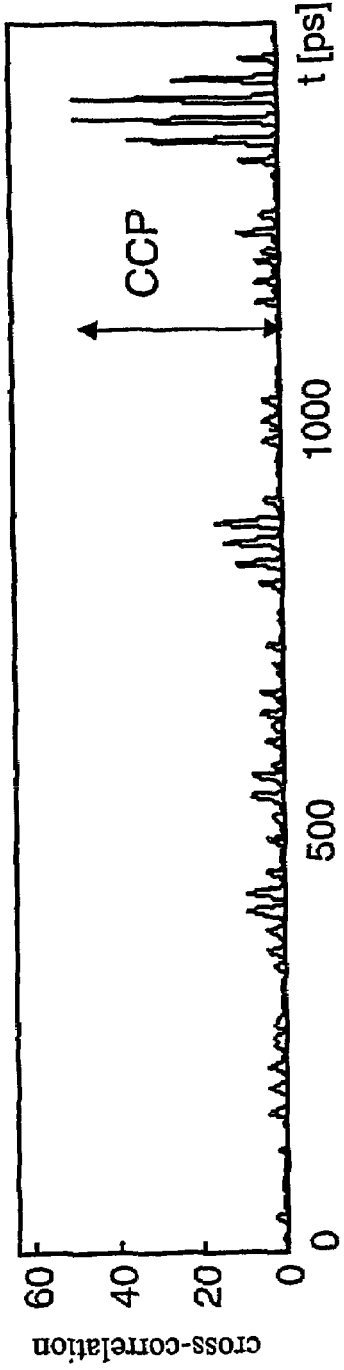

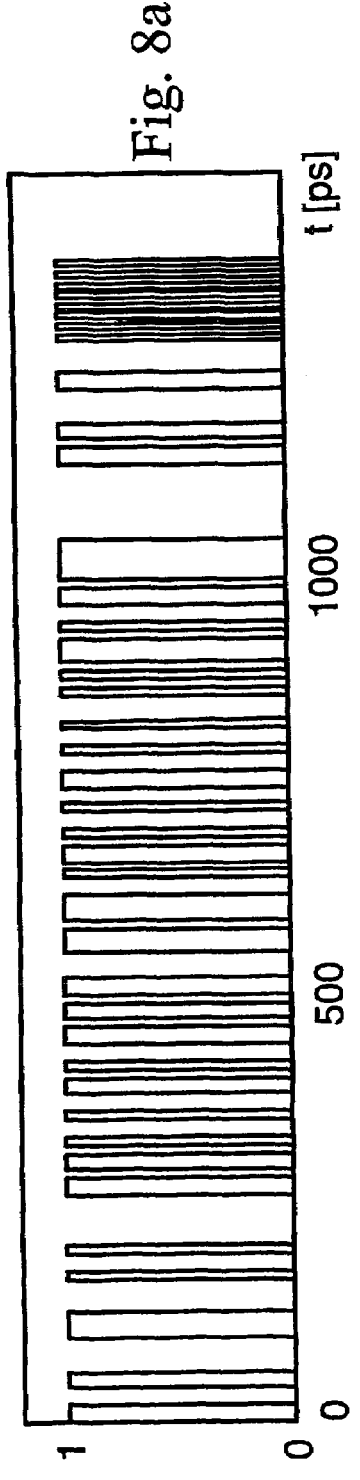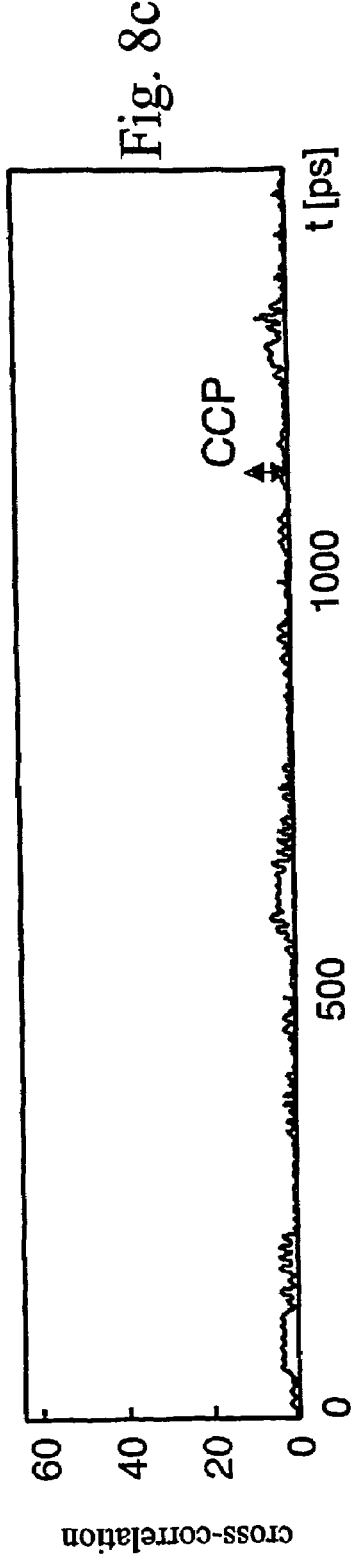
Fig. 8a
Fig. 8b
Fig. 8c

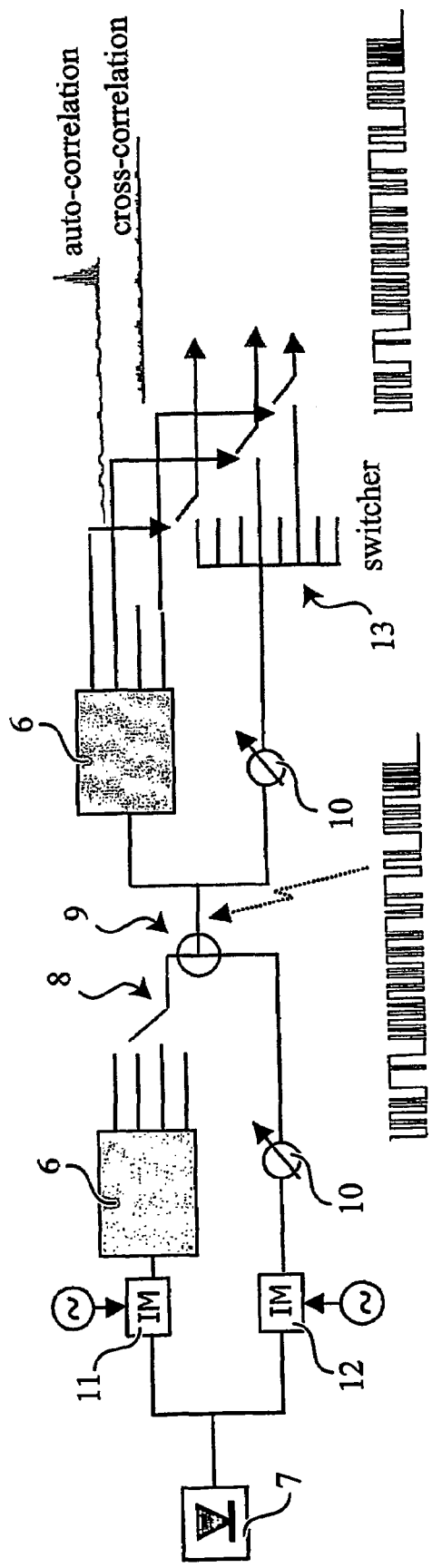
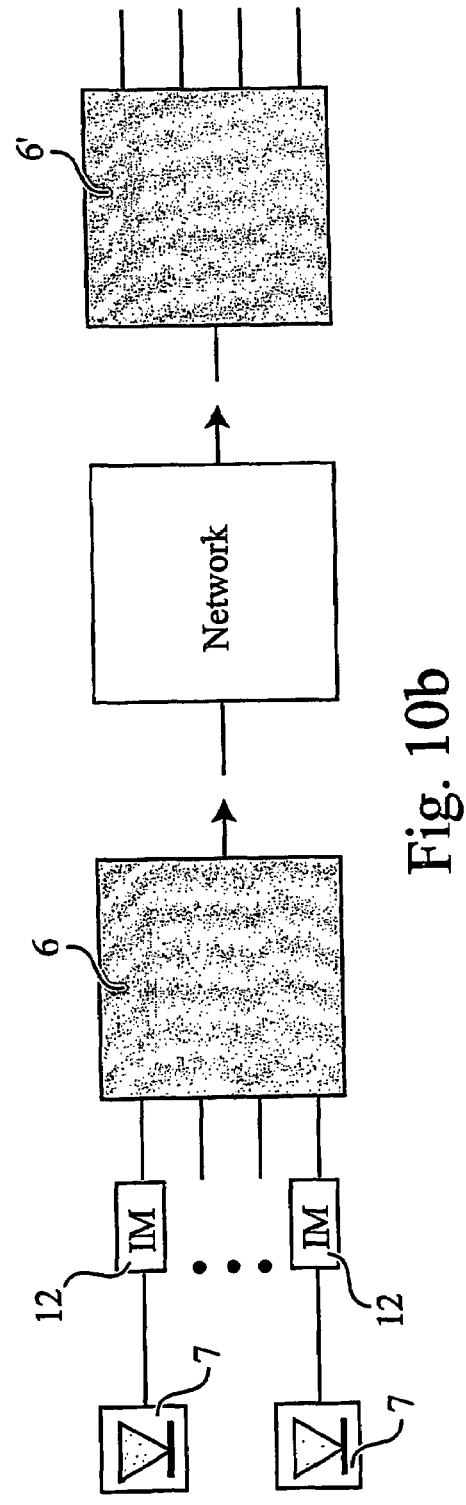
Fig. 10a
Fig. 10b

OPTICAL DEVICE FOR SIMULTANEOUSLY GENERATING AND PROCESSING OPTICAL CODES

BACKGROUND OF THE INVENTION

1. Field of the Invention

The present invention refers to an optical device, preferably realised in Planar Lightwave Circuits or PLC technology, for simultaneously generating and processing optical codes, which allows the label generation and processing to be executed directly in the optical domain and which is accurate, reliable, simple, and inexpensive. In particular, the device may be used in Multi Protocol Label Switching or MPLS communication networks, and in Code Division Multiple Access or CDMA network.

1. Description of the Related Art

The presently most diffused communication networks, employing the IP (Internet Protocol) protocol, use a SONET/SDH (Synchronous Optical NETwork/Synchronous Digital Hierarchy) transport layer over which an ATM (Asynchronous Transfer Mode) switching layer rests, on which data according to IP protocol travel. In particular, voice traffic typically travels on SONET/SDH layer. Such networks allows even more than one wavelength to be employed for transmission, according to WDM (Wavelenght Division Multiplexing). This four-layer architecture is too slow for managing high traffic volume at reasonable costs. But above all it is inefficient as far as scalability and flexibility of the whole network are concerned.

For these reasons, MPLS system has been proposed and standardised by IETF (Internet Engineering Task Force) organisation, system which is based upon a set of protocols used for scaling and managing optical networks so as to reduce the protocol stack, by incorporating the SONET/SDH and ATM layers into one sole IP/MPLS layer. In fact, as described by K. H. Liu in "*IP Over WDM*", John Wileym & Sons, Ltd West Sussex, England 2003, by M. Murata and K. I. Kitayama in "*A perspective on photonic multiprotocol label switching*", IEEE Network, July/August, pp. 56-63, 2001, by R. Xu, Q. Gong and P. Ye in "*A novel IP with MPLS over WDM-based broad-band wavelength switched IP network*", IEEE J. Lightwave Technol., vol. 19, n. 5, pp. 596-602, 2001, by M. Koga in "*Photonic MPLS router*", Proc. Lasers and Electro-Optics, (CLEO), Long Beach, Calif. USA, vol. 1, pp. 581-582, vol. 1, 2002, and by D. J. Blumenthal in "*Photonic packet and all-optical label switching technologies and techniques*", Opt. Fiber Comm. Conf. (OFC), Anaheim, Calif. USA, paper W03, pp. 282-284, 2002, MPLS protocols overlap IP protocols for simplifying traffic engineering and allowing the use of the network resources to be efficient.

With reference to FIG. 1a, at input node 1 of a MPLS network, a label 2 having constant format is inserted at the head (or at the tail) of each data packet 3. In particular, such labels are codes generally having up to 32 bits, each label bit being more properly called chip. At each following node 4, the packet 3 is routed on the basis of the value of the label 2 itself until destination node 5, which finally receives the packet 3.

In other words, MPLS networks generates virtual link or tunnel connecting external nodes 1 and 5 of an optical network. If a data packet 3 is entered in the input of a tunnel, the normal IP procedure are suspended and packets are routed towards destination node 5 on the basis of only the value of the labels 2, according to the so-called label switching.

Hence, MPLS protocol does not replace the normal routing of IP packets, but it overlaps this protocol for increasing data transmission speed, allocating a sufficient band for traffic flows with different QoS (Quality of Service) requirements.

However MPLS networks present some drawbacks.

The main limitation in current MPLS networks is the fact that label generation and processing occur at electronic level instead of optical, limiting in a very large measure the maximum transmission speed, which is reduced to the order of 10 Gbit/sec.

In fact, current technology uses labels, i.e. codes with length up to 32 chips which are inserted at the front (or at the back) of the data packet; the so obtained electric signal is converted in an optical signal and transmitted into the MPLS network. At each single node, the optical signal, comprising the data packet 3 and the label 2, has to be reconverted in an electric signal from which the label 2 is extracted. The label 2 is read by carrying out the correlation between the label 2 itself and all the other labels, which are inserted into a table of stored codes.

The labels are all orthogonal with respect to each other and only when the input label matches its corresponding one in the table there is a peak of the auto-correlation function. In such case, the data packet 3 provided with the same label 2 is converted again from electric to optical signal and routed to the subsequent node. In the case when it is necessary a label change, the data packet is provided with a new label, through a label swapper, and then routed. All the above involves that at each node an electric-optical-electric double conversion is needed, using a photodetector and a laser source. It is known that these devices make up more than 75% of the cost of an optical network and that hence it is financially advantageous to reduce their use at most.

Some solutions to these drawbacks have been proposed by K.-I. Kitayama, N. Wada, and H. Sotobayashi in "*Architectural considerations for photonic IP router based upon optical code correlation*", IEEE J. Lightwave Technol., vol. 18, n. 12, pp. 1834-1844, 2000, by K.-I. Kitayama and N. Wada in "*Photonic IP routing*", IEEE J. Lightwave Technol., vol. 11, n. 12, pp. 1689-1691, 1999, by N. Wada and K.-I. Kitayama in "*Photonic IP routing using optical codes: 10 Gbit/s optical packet transfer experiment*", Proc. Optical Fiber Communication Conference (OFC), Baltimore, Md. USA, vol. 2, paper WM51-1, pp. 362-364, 2000, and by K.-I. Kitayama and M. Murata in "*Photonic access node using optical-code based label processing and its applications to optical data networking*", IEEE J. Lightwave Technol., vol. 19, n. 10, pp. 1401-1415, 2001. In particular, in such architectures it has been proposed to generate and process labels directly in the optical domain.

Since in order to read a label it is necessary to carry out N correlations between the input label and all the N labels of the table, such solutions carry out said N correlations in the optical domain by using N different devices, one for each label.

This consequently entails other drawbacks, due to the complexity and to the cost of the correlation apparatus, which requires N copies of each packet and N correlators.

Another solution for managing MPLS networks directly in the optical domain is to use multi protocol wavelength switching or MPλS (Multi Protocol Lambda Switching) systems, also called generalised MPLS systems, wherein different wavelengths are used as labels.

However, also these systems present some drawbacks.

The main limitation of these systems is the small code cardinality, i.e. the small number of labels, due to the strict one-to-one correspondence between labels and corresponding wavelengths $\lambda$.

Moreover, generalised MPLS systems need tunable laser sources for generating different wavelengths which are more expensive than normal laser sources.

Furthermore, these systems need a demultiplexer at each node for reading the different labels.

What has been described so far is valid also for CDMA networks, wherein multiple access techniques make simultaneous access to a transmission channel possible for a large number of users.

In particular, the CDMA technique assigns a specific code to each user, code which is independent of the information signal to be transmitted. The encoding operation, called spreading, consists of multiplying the code assigned to each single user by the information signal. Instead, in the decoding operation, the receiver carries out a correlation between the received signal and the code of the user which is intended to be received (despreading). In order to avoid interference among the various users simultaneously accessing to the network, it is necessary that the codes are orthogonal with respect to each other.

As described by D. D. Sampson, G. J. Pendock, and R. A. Griffin in "*Photonic Code-division multiple access communications*" Fibre and lnt. Opt., vol. 16, pp. 129-157, 1997, by M. Azizoglu, J. A. Salehi, and Y. Li, in "Optical CDMA via temporal codes" IEEE Trans. Commun., vol 40, n. 7, pp. 1162-1170 (1992), by J. A. Salehi in "Code division multiple-access techniques in optical fiber networks-part I: fundamental principles," IEEE Trans. Commun., vol 37, n. 8, pp. 824-833 (1989), by M. E. Marhic, in "Coherent optical CDMA networks", J. Lightwave Technol., vol. 11, n. 5/6, pp. 854-864 (1993) and by K.-I. Kitayama in "*Code division multiplexing lightwave networks based upon optical code conversion*" IEEE J. Select. Areas Commun., vol. 16, n. 7, pp. 1309-1319, 1998, in a multiple access optical network, as the one schematically shown in FIG. 1*b*, the signals transmitted by all the users 50 are distributed to each receiver 51 by means of a star coupler 52. If data coding and decoding are carried out in the optical domain, aggregated transmission speeds very much higher than the ones possible with electronic encoders and decoders are reached. In all the architectures proposed in literature N different encoders 53, one for each user 50, are used. At reception, decoding is carried out by using an adapted filter, once that the desired user code is known. Obviously it is necessary to have N different decoders 54, one for each code.

MPLS and CDMA networks present further drawbacks.

In fact, in order to precisely distinguish the different optical codes, it is necessary that the peak of the auto-correlation function is as higher as possible whereas the cross-correlation function must be close to zero everywhere. A review of characteristics and properties of the optical codes proposed in literature has been made by S. W. Lee and D. H. Green in "*Coding for coherent optical CDMA networks*", IEEE Proc. Commun., vol. 145, n. 3, pp. 117-125, 1998, by S. W. Lee and D. H. Green in "*Performance analysis method for optical codes in coherent optical CDMA networks*", IEEE Proc. Commun., vol. 147, n. 1, pp. 41-46, 2000, by S. W. Lee and D. H. Green in "*Performance analysis of optical orthogonal codes in CDMA LANs*", IEEE Proc. Commun., vol. 147, n. 4, pp. 256-271, 1998, by F. R. K. Chung, J. A. Salehi, and V. K. Wei in "*Optical orthogonal codes: design, analysis, and applications*" IEEE Trans. Inform. Theory, vol. 35, n. 3, pp. 595-604, 1989, and by G.-C. Yang and T. E. Puja in "*Optical orthogonal codes with unequal auto- and cross-correlation constraints*", IEEE Trans. Inform. Theory, vol. 41, n. 1, pp. 96-106, 1995. The codes proposed by K.-I. Kitayama, N. Wada, and H. Sotobayashi in "*Architectural considerations for photonic IP router based upon optical code correlation*", IEEE J. Lightwave Technol., vol. 18, n. 12, pp. 1834-1844, 2000, and by K.-I. Kitayama in "*Code division multiplexing lightwave networks based upon optical code conversion*" IEEE J. Select. Areas Commun., vol. 16, n. 7, pp. 1309-1319, 1998 are the Hadamard codes which present an auto correlation peak or ACP equal to ACP=$N^2$, whereas the maximum value of the cross-correlation function or CCP (Cross Correlation Peak) is CCP=$(N-1)^2$. By way of example, in the case when N=8, the auto correlation peak is equal to ACP=64, whereas the maximum value of the cross-correlation function is CCP=49. Consequently, the parameter of code orthogonality is quite high, equal to r=CCP/ACP=49/64=0.77, thus not enabling particularly accurate performances for routers of a MPLS network and for detection in CDMA systems.

SUMMARY OF THE INVENTION

It is therefore an object of the present invention to enable the label generation and processing directly in the optical domain in an accurate, reliable, simple, and inexpensive way.

It is still an object of the present invention to provide for a set of optical codes which are highly orthogonal so as to be recognisable with respect to each other with high accuracy, in particular enabling a precise and reliable routing of data packets which are transmitted on a MPLS network, and a precise and reliable identification of the single users associated to them in a CDMA network.

The invention further refers to a set of optical codes, apt to be generated, in particular, by said optical device, which are highly orthogonal so as to be recognisable with respect to each other with high accuracy. In particular, the use of such codes enables a precise and reliable routing of data packets which are transmitted on a MPLS network and an accurate reception of signals transmitted on CDMA networks.

The invention also relates to networks and apparatus comprising such optical device.

It is specific subject matter of this invention an optical device, apt to generate and process optical codes at at least one wavelength, comprising P inputs s, with $1 \leq s \leq P$, and $P \geq 1$, and N outputs k, with $1 \leq k \leq N$ and $N \geq 1$, characterised in that it is apt to simultaneously generate and process $N_C$ phase and/or amplitude optical codes at one or more wavelengths, with $N_C \geq 2$, made of C chips with time interval $\tau$, with $C \geq 2$, characterised in that the transfer function $T_{sk}(f)$ from the input s to the output k satisfies the following formula:

$$|T_{sk}(f)| = \prod_{v=0}^{V-1} \left| F_v\left(a_v f + \frac{S_{sk}}{N_k \tau}\right)\right|, \text{ for } s = 1, 2, \ldots P \ k = 1, 2, \ldots N$$

where: $F_v(f)$ is a transfer function of an optical filter, for v=0, 1, ..., V−1; $a_v$ is a constant value, for v=0, 1, ..., V−1; $S_{sk}$ is an integer number ($S_{sk} \in Z$); $N_k$ is a constant value, for k=1, 2, ... N; and V is a positive integer number with $1 \leq V \leq \log_2 N$.

Preferably according to the invention, the transfer function $T_{sk}(f)$ from the input s to the output k is equal to:

$$T_{sk}(f) = \prod_{v=0}^{V-1} F_v\left(a_v f + \frac{S_{sk}}{N_k \tau}\right), \text{ for } s = 1, 2, \ldots P \ k = 1, 2, \ldots N$$

Always according to the invention, the number C of chips may be larger than or equal to the number N of outputs k (C≧N).

Still according to the invention, the number $N_C$ of optical codes which it is apt to simultaneously generate and process may be larger than or equal to the number N of outputs k ($N_C$≧N).

Furthermore according to the invention, the number N of outputs k may be an involution of 2 ($N=2^z$, with z equal to a positive integer or to zero).

Always according to the invention, $N_k$ may be an integer constant value, for k=1, 2, ... N.

Still according to the invention, the number P of inputs s may be equal to 1 (P=1).

Furthermore according to the invention, the device may comprise at least a tree of optical filters, each filter including an input and two outputs, each tree comprising an input, L levels and $N_t$ outputs, with L≧1 and 1≦$N_t$≦$2^L$, each filter having a respective direct transfer function H(f) and a respective cross transfer function G(f), the L levels of the tree being located according to an increasing order from the root to the leaves or from the leaves to the root.

Preferably according to the invention, the direct and cross transfer functions H(f) and G(f) of each optical filter of said at least one tree correspond to the transfer functions of two Finite Impulse Response, or FIR, Quadrature Mirror Filters, or QMFs, of length M, with M≧2, satisfying the following formula:

$$G(f) = e^{-j2\pi f\tau} H^*\left(f + \frac{1}{2\tau}\right)$$

where asterisk indicates the complex conjugation.

Always according to the invention, the transfer function $T_{sk}(f)=T_k(f)$ from the tree input to an output k located on a level V may satisfy the following formula:

$$|T_k(f)| = \prod_{v=0}^{V-1} \left|F_v\left(a_v f + \frac{S_{sk}}{N_k \tau}\right)\right| = \prod_{v=0}^{V-1} |F_v(2^v f)|, \text{ for } k = 1, 2, \ldots N_t$$

where: each factor $F_v(f)$ of the product is equal to G(f) or to H(f), for v=0, 1, ..., V−1; $a_v=2^v$, for v=0, 1, ..., V−1; $S_{sk}=0$; and V≦L.

Still according to the invention, the coefficients h[k] and g[k] of the direct and cross transfer functions H(f) and G(f) of each optical filter may satisfy the following formulas:

$$g[k]=(-1)^k h[1-k]$$

$$\sum_{k=0}^{M-1} h[k] h[k+2n] = \delta[n] \quad n \in Z$$

$$\sum_{k=0}^{M-1} h[k] = \sqrt{2}$$

$$\sum_{k=0}^{M-1} (-1)^k h[k] = 0$$

where δ[n] is the Kronecker delta function.

Always according to the invention, each optical filter may be a planar filter with unit delay $2^l\tau$, where l is the level on which the filter is located, with 0≦l≦L−1, the L levels of the tree being identified by the index l according to an increasing order from the root to the leaves or from the leaves to the root.

Furthermore according to the invention, the transfer function $T_{sk}(f)=T_k(f)$ from the input to an output k may satisfy the following formula:

$$|T_k(f)| = \prod_{v=0}^{V-1} \left|F_v\left(a_v f + \frac{S_{sk}}{N_k \tau}\right)\right| = \left|F_0\left(f + \frac{S_k}{N_t \tau}\right)\right|, \text{ for } k = 1, 2, \ldots N_t$$

where: $F_0(f)$ is a reference transfer function; $a_v=1$; $S_{sk}=S_k$; $N_k=N_t$; and V=1.

Still according to the invention, the transfer function $T_{sk}(f)=T_k(f)$ from the input to an output k may satisfy the following formula:

$$|T_k(f)| = \prod_{v=0}^{V-1} \left|F_v\left(a_v f + \frac{S_{sk}}{N_k \tau}\right)\right| = \left|F_0\left(f + \frac{S_k}{2^l \tau}\right)\right|, \text{ for } k = 1, 2, \ldots N_t$$

where: $F_0(f)$ is a reference transfer function; $a_v=1$; $S_{sk}=S_k$; $N_k=2^l$; l is the level on which the output k is located, with 0≦l≦L−1, the L tree levels being identified by the index l according to an increasing order from the root to the leaves or from the leaves to the root; and V=1.

Always according to the invention, each optical filter may comprise at least one Mach-Zehnder Interferometer or MZI.

Still according to the invention, each optical filter may have input and output 3 dB symmetrical directional couplers.

Furthermore according to the invention, each optical filter may comprise only one MZI, having length M=2 and delay between arms $2^l\tau$, where l is the level on which the filter is located, with 0≦l≦L−1, the L tree levels being identified by the index l according to an increasing order from the root to the leaves or from the leaves to the root.

Always according to the invention, each optical filter may comprise a chain of two MZIs, said chain having length M=4 and delay between arms $2^l\tau$ and $2^{l+1}\tau$, where l is the level on which the filter is located, with 0≦l≦L−1, the L tree levels being identified by the index l according to an increasing order from the root to the leaves or from the leaves to the root.

Still according to the invention, a ΔΦ constant phase optical phase shifter may be inserted along at least one of the arms of at least one MZI.

Preferably according to the invention, the device comprises at least one tree having at least one node comprising a first coupler, including $N_{IN}$ input waveguides and $N_a$ output waveguides, with $N_{IN}$≧1 and $N_a$≧1, the outputs of which are connected to a grating including $N_a$ waveguides, which are in turn connected to $N_a$ input waveguides of a second coupler, including $N_{OUT}$ output waveguides, where $N_{OUT}$≧1. In particular, said couplers may be without distinction directional couplers and/or focusing couplers or "slabs") and/or multi mode interference couplers.

Always according to the invention, the device may be such that $N_{IN}=N_a=N_{OUT}=N_{GRA}$.

Furthermore according to the invention, a constant optical phase shifter of value $\theta_j$ may be inserted along at least one of the waveguides j of the grating with j=1, 2, ... $N_a$.

Still according to the invention, the lengths $L_j$, with j=1, 2 ... $N_a$, of the waveguides of the grating, with j=1, 2 ... $N_a$, may be equal to $$L_j = L_m + d_j \Delta L \; j=1, 2, \ldots N_a$$

with the integer number $d_j \in [0, 1, 2, \ldots N_a-1]$ satisfying the condition $d_k \neq d_{k'}$ if $k \neq k'$, where $L_{m'}$ is the length of a reference waveguide, equal to the shortest waveguide, whereby $d_{m'}=0$, and $\Delta L$ is the minimum difference between the lengths of two waveguides of the grating.

Always according to the invention, the device may be such that $$d_j = \left\{ \frac{1}{2} \left[ (-1)^{j+m'} \left( j - \frac{1}{2} \right) - \left( m' - \frac{1}{2} \right) \right] \right\} \bmod N_a \; m', \; j = 1, 2, \ldots N_a$$

where "mod" indicates the arithmetical module operator.

Still according to the invention, the device may be such that $d_j=2j$, with j=1, 2 ..., $N_a$, where only the even inputs i (i=2r, for r=1, 2, ..., int[$N_{IN}/2$], where "int" indicates the arithmetical operator giving the integer quotient of a division) and the even outputs k (k=2r', for r'=1, 2, ..., int[$N_{OUT}/2$]) are used.

Furthermore according to the invention, the first coupler may be a uniform Multi Mode Interference or MMI coupler, or a non uniform power splitter MMI coupler.

Always according to the invention, the first MMI coupler may have a length $$L_c = M_c 3 L_\pi / N_a,$$

where $M_c$ is a positive integer number, and $$L_\pi = \frac{\pi}{\beta_0 - \beta_1} = \frac{4 n_g W_e^2}{3 \lambda}$$

where: $\beta_0$ and $\beta 1$ are propagation constants of the zeroth and first order modes, respectively; $n_g$ is the effective refractive index; $\lambda$ is the free space wavelength of the input radiation; and $W_e$ is the effective width of the fundamental transverse mode, the device being possibly such that, assuming that the first MMI coupler input waveguides are identified by an index i which increases according to a transverse direction and that the output waveguides are identified by an index j' which increases according to said same transverse direction, the input waveguides i and the output waveguides j' are located, respectively, in positions $x_i$ and $x_{j'}$ equal to:

$$x_i = (2i - 1) \frac{W_e}{2 N_{IN}} \; i = 1, 2, \ldots N_{IN}$$

$$x_{j'} = (2j' - 1) \frac{W_e}{2 N_a} \; j' = 1, 2, \ldots N_a$$

Still according to the invention, the device may be such that $M_c$ and $N_a$ are two positive integer numbers without a common divisor larger than 1.

Preferably according to the invention, the device is such that $M_c=1$.

Always according to the invention, the second coupler may be a uniform MMI coupler, or a non uniform power splitter MMI coupler.

Still according to the invention, the second MMI coupler may have a length $$L'_c M'_c 3 L'_\pi / N_{OUT},$$

where $M'_c$ is a positive integer number and $$L'_\pi = \frac{\pi}{\beta'_0 - \beta'_1} = \frac{4 n'_g W_e'^2}{3 \lambda}$$

where: $\beta'_0$ and $\beta'_1$ are propagation constants of the zeroth and first order modes, respectively; $n'_g$ is the effective refractive index; $\lambda$ is the free space wavelength of the input radiation; and $W'_e$ is the effective width of the fundamental transverse mode, the device being possibly such that, assuming that the second MMI coupler input waveguides are identified by an index j" which increases according to a transverse direction and that the output waveguides are identified by an index k which increases according to said same transverse direction, the input waveguides j" and the output waveguides k are located, respectively, in positions $x'_{j''}$ and $x'_k$ equal to:

$$x'_{j''} = (2j'' - 1) \frac{W'_e}{2 N_a} \quad per \; j'' = 1, 2, \ldots, N_a$$

$$x'_k = (2k - 1) \frac{W'_e}{2 N_{out}} \quad per \; k = 1, 2, \ldots, N_{OUT}$$

Furthermore according to the invention, the device may be such that $M'_c$ and $N_{OUT}$ are two positive integer numbers without a common divisor larger than 1.

Preferably according to the invention, the device is such that $M'_c=1$.

Still according to the invention, the values $\theta_j$ of the phase shifters along the waveguides of the grating may be equal to $$\phi_{ij} + \phi'_{jm} + \theta_j = 2\pi A_{ikm}$$

for i=1, 2, ..., $N_{IN}$ j=1, 2, ..., $N_a$ m=1, 2, ..., $N_{OUT}$ k=1, 2, ..., $N_{OUT}$ where $$\varphi_{ij} = \phi_1 - \frac{\pi}{2}(-1)^{i+j+N_{GRA}} + \frac{\pi}{4 N_{GRA}} \left[ \begin{array}{l} i + j - i^2 - j^2 + \\ (-1)^{i+j+N_{GRA}} \left( 2ij - i - j + \frac{1}{2} \right) \end{array} \right]$$

with $$\phi_1 = -\beta_0 \frac{3 M_C L_\pi}{N_{GRA}} - \frac{9\pi}{8 N_{GRA}} + \frac{3\pi}{4},$$

and $$\varphi'_{jm} = \phi'_1 - \frac{\pi}{2}(-1)^{j+m+N_{GRA}} + \frac{\pi}{4 N_{GRA}} \left[ \begin{array}{l} j + m - j^2 - m^2 + \\ (-1)^{j+m+N_{GRA}} \left( 2jm - j - m + \frac{1}{2} \right) \end{array} \right]$$

with $$\phi'_1 = -\beta'_0 \frac{3 M'_C L'_\pi}{N_{GRA}} - \frac{9\pi}{8 N_{GRA}} + \frac{3\pi}{4},$$

where $A_{jkm}$ are integer constants.

Furthermore according to the invention, the absolute value of the transfer function $T_{ik}(f)$ from an input i of the first coupler to the output k of the second coupler may be a frequency translated copy of the absolute value of the reference transfer function $T_{im}(f)$, from the input i of the first coupler (21) to an output m of the second coupler, so that:

$$|T_{ik}(f)| = \prod_{v=0}^{V-1} \left|F_v\left(a_v f + \frac{S_{ik}}{N_k \tau}\right)\right| = \left|T_{im}\left(f - n\frac{c}{n_e N_k \Delta L}\right)\right|$$

for i=1, 2, ..., $N_{IN}$ k,m=1, 2, ..., $N_{OUT}$ where: $F_0(f)=T_{im}(f)$; c is the light speed; $a_v=1$; $n_e$ is the refractive index of the waveguides of the grating; V=1; and $S_{sk}=-n$, where n is an integer number satisfying the condition that the values corresponding to two different outputs k e k' are different (k≠k'→n≠n' k,k'=1, 2, ..., $N_{OUT}$), whereby the time constant τ is equal to $$\tau = \frac{\Delta L \cdot n_e}{c}.$$

Always according to the invention, the device may be such that $N_k=N_{OUT}$ for k=1, 2, ..., $N_{OUT}$.

Still according to the invention, the first coupler may be a focusing coupler or "slab".

Furthermore according to the invention, the second coupler may be a focusing coupler or "slab".

Preferably according to the invention, the location of the input and output waveguides on the first coupler and on the second coupler may be based on the Rowland circle construction.

Always according to the invention, the length of the adjacent waveguides in the grating varies by a constant ΔL.

Still according to the invention, the device may be such that $$N_a = \frac{\lambda R}{n_s d d_o}$$

where: λ is the wavelength of the input optical signal; R is the focal length of the first and second focusing couplers; $n_s$ is the effective refractive index of the first and second focusing couplers; d is the pitch of the waveguide grating; and $d_o$ is the pitch of the $N_{IN}$ input waveguides and the $N_{OUT}$ output waveguides.

Furthermore according to the invention, assuming that the $N_{IN}$ input waveguides and the $N_{OUT}$ output waveguides are identified, respectively, by an index i and by an index k which increase according to the same transverse direction, the absolute value of the transfer function $T_{ik}(f)$ from an input i of the first coupler to the output k of the second coupler may be a frequency translated copy of the absolute value of a reference transfer function $$T_{im_{REF\_i}}(f),$$

from the same input i to a corresponding reference output $m_{REF\_i}$, with $1 \leq m_{REF\_i} \leq N_{OUT}$, so that:

$$|T_{ik}(f)| = \prod_{v=0}^{V-1} \left|F_v\left(a_v f + \frac{S_{ik}}{N_k \tau}\right)\right| = \left|T_{im_{REF\_i}}\left(f - \frac{i+k}{N_k \tau}\right)\right|$$

$$i = 1, 2, \ldots, N_{IN} \quad k = 1, 2, \ldots, N_{OUT}$$

where:

$$F_0(f) = T_{im_{REF\_i}}(f);$$

c is the light speed; $a_v=1$; $n_e$ is the refractive index of the waveguides of the grating; V=1; $S_{sk}=(i+k)$; and the time constant τ is equal to $$\tau = \frac{\Delta L \cdot n_e}{c}.$$

Preferably according to the invention, the index $m_{REF\_i}$ of the reference output waveguide corresponding to the input i is equal to:

$$m_{REF\_i} = \begin{cases} N_{GRA} - i & \text{for } i \neq N_{GRA} \\ N_{GRA} & \text{for } i = N_{GRA} \end{cases} \quad i = 1, 2, \ldots, N_{GRA}$$

Furthermore according to the invention, the device may be such that $N_k=N_{OUT}$ for k=1, 2, ..., $N_{OUT}$.

It is still specific subject matter of this invention an optical signal comprising at least one phase and/or amplitude optical code including C chips of interval τ at at least one wavelength, characterised in that it is generated at at least one of the N outputs k of the previously described optical device, by sending at least one optical signal to at least one of the P inputs s of the optical device.

Always according to the invention, the chip phases of said at least one code may be integer multiples of 2π/C, i.e. they may be equal to $2k_2\pi/C$ with $k_2$ positive or negative integer or null ($k_2 \in Z$).

Preferably according to the invention, said at least one optical code is a PSK code.

Still according to the invention, said at least one optical code may be generated by the previously described optical device, by sending U impulse optical signals, with $2 \leq U \leq P$, to U corresponding inputs s of the optical device, where preferably U=int (P/2).

Furthermore according to the invention, said U impulse optical signals may have the same wavelength.

It is further specific subject matter of this invention an optical signal comprising at least one phase and/or amplitude optical code including C chips of interval τ at at least one wavelength, with $C \geq 2$, characterised in that the chip phases of said at least one code are integer multiples of 2π/C, i.e. they are equal to $2k_2\pi/C$ with $k_2$ positive or negative integer or null ($k_2 \in Z$).

Always according to the invention, said at least one code includes said C chips at at least two wavelengths.

Moreover, it is specific subject matter of this invention a communication network, comprising one or more code generating devices, and one or more code processing and recognising devices, characterised in that at least one of said one or more code generating devices and/or at least one of said one or more code processing and recognising devices comprises at least one previously described optical device.

Preferably according to the invention, said communication network is a Multi Protocol Label Switching or MPLS communication network, or a Code Division Multiple Access or CDMA communication network.

It is still specific subject matter of this invention a code generating device, characterised in that it comprises a previously described optical device, and in that it is apt to be used in a communication network as just described.

It is still specific subject matter of this invention a code processing and recognising device, particularly a router device, characterised in that it comprises a previously described optical device, for controlling at least one optical switcher on the basis of at least one recognised optical code, and in that it is apt to be used in a communication network as just described.

BRIEF DESCRIPTION OF THE DRAWINGS

The present invention will be now described, by way of illustration and not by way of limitation, according to its preferred embodiments, by particularly referring to the Figures of the enclosed drawings, in which:

FIGS. 4a and 4b show the application of the device of FIG. 3, respectively, as label generator in a MPLS network and as encoder in a CDMA network;

FIGS. 6a, 6b, and 6c respectively show an optical signal at the input of the device of FIG. 3, and the resulting auto-correlation and maximum cross-correlation signals obtained at the outputs;

FIGS. 8a, 8b, and 8c respectively show an optical signal at the input of the device of FIG. 7, and the resulting auto-correlation and maximum cross-correlation signals obtained at the outputs;

FIGS. 10a and 10b show the application of the device of FIG. 7, respectively, in a MPLS network and in a CDMA network;

In the Figures, alike elements are indicated with same reference numbers.

DETAILED DESCRIPTION OF THE PREFERRED EMBODIMENTS

The inventor has developed a device which makes possible to simultaneously generate and process N codes directly in the optical domain avoiding all the optical-electrical and vice versa conversions. The same device is capable to both simultaneously generate all the codes and simultaneously process them, and hence it may be used in both input nodes and passage nodes of a MPLS optical network, or in both transmission and reception in a CDMA network.

A first embodiment of the optical device according to the invention uses the Wavelet Packets or WP decomposition and Multi-Resolution Analysis or MRA, which employ a pair of Finite Impulse Response, or FIR, conjugate Quadrature Mirror Filters, or QMFs, H(f) e G(f). The coefficients h[n] and g[n] of such filters, having length equal to M, satisfy the following equations:

$$g[k] = (-1)^k h[1-k] \quad [1]$$

$$\sum_{k=0}^{M-1} h[k]h[k+2n] = \delta[n] \quad n \in Z$$

$$\sum_{k=0}^{M-1} h[k] = \sqrt{2}$$

$$\sum_{k=0}^{M-1} (-1)^k h[k] = 0$$

where $\delta[n]$ is the Kronecker delta function. The wavelet atoms are a sequence of functions, defined in the following recursive manner:

$$w_{l+1,2m}(t) = \sum_{k=0}^{M-1} h[k] w_{l,m}(t - 2^l k\tau)$$

$$w_{l+1,2m+1}(t) = \sum_{k=0}^{M-1} g[k] w_{l,m}(t - 2^l k\tau) \quad [2]$$

$$l > 0, \quad 0 \le m \le 2^l - 1$$

where l, equal to a positive integer number ($l \subset Z^+$), is the decomposition level, and m, also equal to a positive integer number ($m \subset Z^+$), is the wavelet atom position in the tree, and $\tau$ is a constant unit delay, that coincides with the interval between the chips of the code sequence, the function $w_{0,0}(t)$ is the scaling function of the MRA, which satisfies the scaling equation $$w_{0,0}(t) = \sqrt{2} \sum_{k=0}^{M-1} h[k] w_{0,0}(2t - k\tau) \quad [3]$$

The WP atoms are self and mutually orthogonal functions at integer multiples of dyadic intervals:

$$<w_{l,m}(t-2^l n\tau) w_{\lambda,\mu}(t-2^\lambda k\tau)> = \delta[l-\lambda]\delta[m-\mu]\delta[n-k]$$

$$l, \lambda \ge 0, \ 0 \le m \le 2^l-1, \ 0 \le \mu \le 2^\lambda-1, \ n, k \in Z^+ \quad [4]$$

where the angular brackets "< >" indicate the inner product. Starting from formula [2], a wavelet atom may be expressed as $$w_{l,m}(t) = \sum_{k=0}^{(2^l-1)(M-1)} f_{l,m}[k]w_{0,0}(t-k\tau) \quad [5]$$

where $$f_{l,m}[k] = <w_{l,m}(t)w_{0,0}(t-k\tau)> \quad [6]$$

is the equivalent filter from (l,m) terminal to the root node, which may be recursively computed by using formula [2]. Therefore, the orthogonality condition of formula [4] is:

$$<f_{l,m}[k-2^l n]f_{\lambda,\mu}[k-2^\lambda i]> = \delta[l-\lambda]\delta[m-\mu]\delta[n-i]$$

$$l,\lambda \geq 0, 0 \leq m \leq 2^l-1, 0 \leq \mu \leq 2^\lambda-1, n, i \in Z^+ \quad [7]$$

and the coefficients of the filters $f_{l,m}[k]$ (with $l \geq 0$, $0 \leq m \leq 2^l-1$) are a set of self and mutually orthogonal codes, of length equal to $$(2^l-1)(M-1)+1$$

Figure 2:
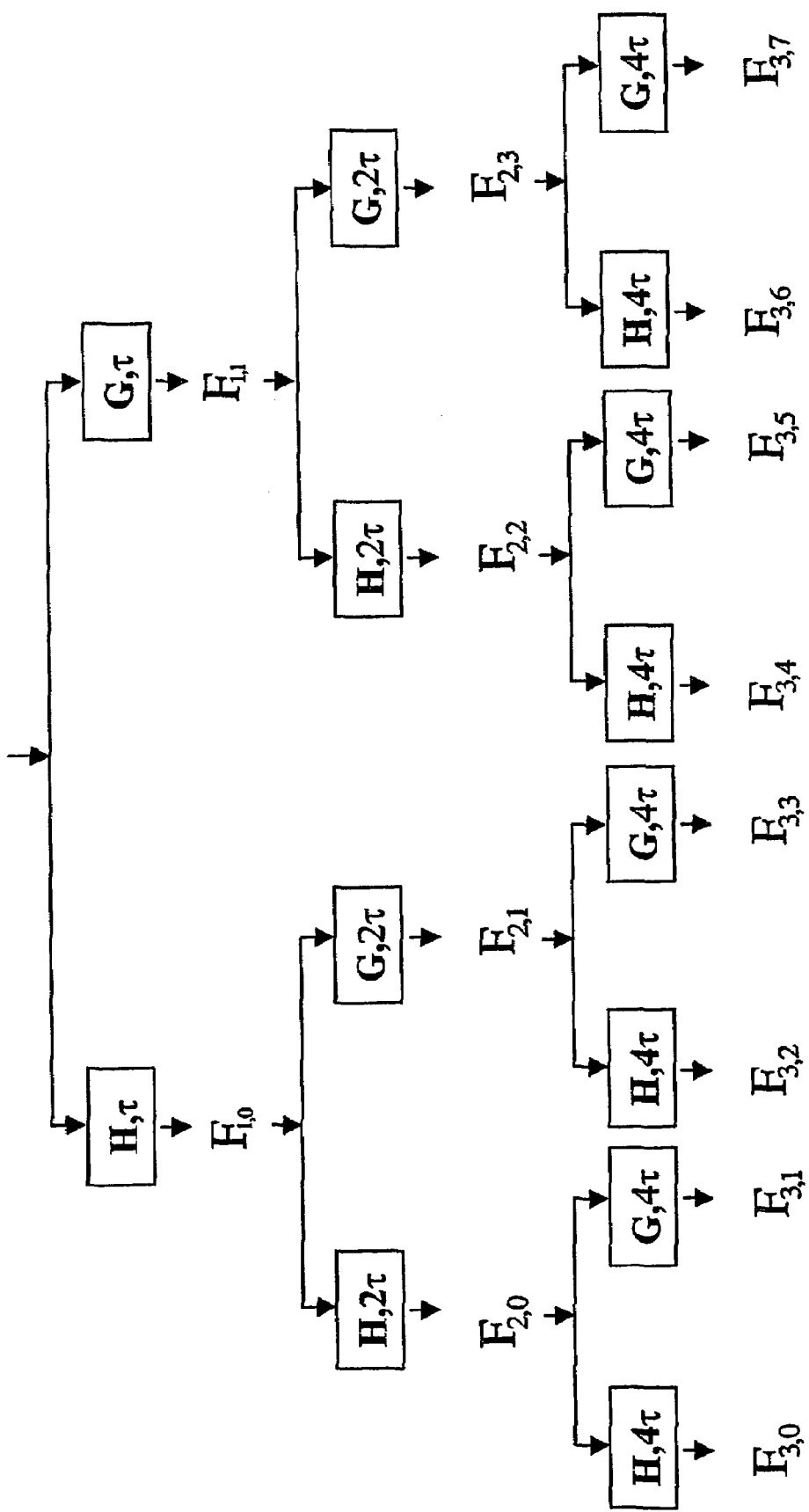
FIG. 2 schematically shows a first embodiment of the optical device according to the invention.

The scheme of a full WP decomposition tree is shown in FIG. 2, where each stage is a filter with unit delay increasing in logarithmic progression. A single pulse with duration shorter than τ at the input of the optical device 6 of FIG. 2, gives origin to a set of Optical Codes (OCs) at the tree terminals, having length $(2^l-1)(M-1)+1$. All the tree nodes furnish different OCs, even though only the terminals at the same decomposition level (i.e. having same l) generate labels having the same length; moreover, it is possible to add or drop users by simply adding or pruning the tree terminals, without any modification of the existing labels, resulting in a OC set with theoretically infinite code cardinality. In other words, each label is orthogonal to its own time shifted versions, and all the labels generated at any decomposition level are orthogonal with respect to each other.

The device of FIG. 2 may be considered as a set of multiple band filters, wherein the Fourier transforms are:

$$F_{l,m}(\omega) = \sum_{k=0}^{(2^l-1)(M-1)} f_{l,m}[k]e^{-j\omega k\tau} \quad l \geq 1, 0 \leq m \leq 2^l-1 \quad [8]$$

and have the following representation:

$$F_{l,m}(\omega) = \prod_{k=0}^{l-1} F(2^k \omega) \quad [9]$$

(with F=H or G). In addition, it is:

$$F_{1,0}(\omega) = H(\omega) = \sum_{k=0}^{M-1} h[k]e^{-j\omega k\tau} \quad [10]$$

-continued $$F_{1,1}(\omega) = G(\omega) = \sum_{k=0}^{M-1} g[k]e^{-j\omega k\tau}$$

Figure 3:
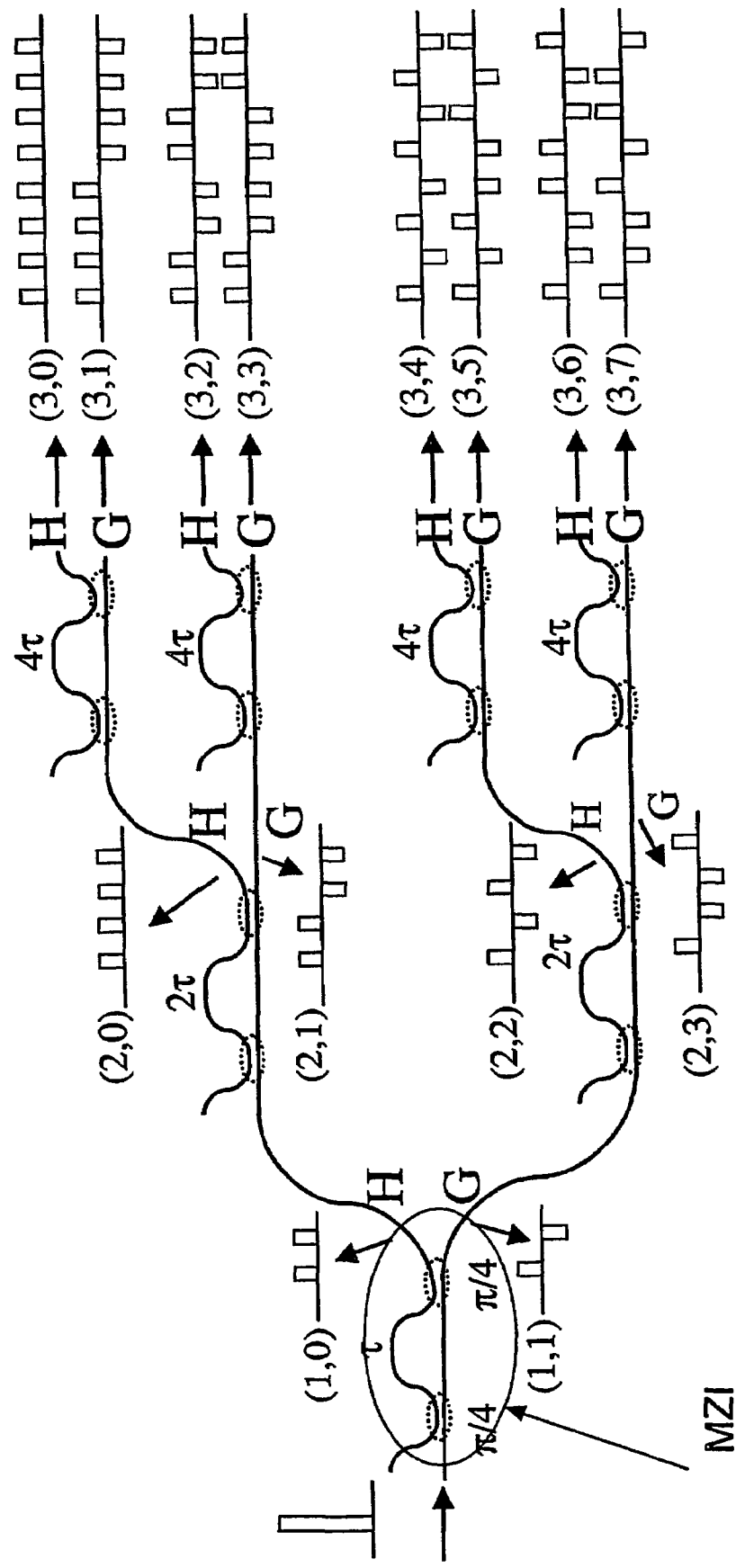
FIG. 3 shows a preferred embodiment of the optical device according to the invention according to the scheme of FIG. 2.

A full WP decomposition tree may be implemented in the optical domain by using PLC technology on a single substrate. FIG. 3 shows a preferred embodiment of the device according to the invention related to the Haar wavelet packets with decomposition level l=3. The device is a tree of Mach-Zehnder interferometers or MZIs having input and output 3 dB symmetrical directional couplers and unit delays increasing in logarithmic progression. The QMFs of the Haar wavelet decomposition have length M=2:

$$h[k]=1/\sqrt{2}[1\ 1]$$

$$g[k]=1/\sqrt{2}[1\ -1]$$

The device schematised in FIG. 3 generates optical codes which coincide with the Hadamard codes, and which are binary Phase Shift Keying or PSK codes of length N, made of N chip pulses with interval τ.

With reference to FIG. 4a, it may be observed that the use of the optical device of FIG. 3 as label generator (in a MPLS network), indicated by reference number 6, provided with one input and N outputs, where N is the number of labels which are generated. A train of light pulses (single chip pulses which then generate the optical codes) is sent to the input of the device 6, the light pulses being obtained by modulating the output of an optical source 7, through a first modulator 11, and the N labels are simultaneously present at each output port. In order to select a label it is needed simply to choose the corresponding output of the device 6 through an electro-optical switcher 8, and hence the optical network may be reconfigured any time when it is necessary in a very simple manner. The selected label 2 is inserted at the front (or at the back) of the data packet 3, which is obtained by modulating the output of the optical source 7 through a second modulator 12, by using a directional coupler 9 and a delay line 10.

The device may be used as encoder in the transmission nodes of a CDMA network, as shown in FIG. 4b. In this case, the data to be transmitted, which are obtained by modulating the output of the optical source 7 through the modulator 12, are directly sent to the input of the device. At the output, the encoded signal 40 is obtained, which is transmitted into the multiple access network.

The same device shown in FIG. 3 may be used for simultaneously processing all the optical codes at a router node in a MPLS network, or in the receiving systems of CDMA networks.

Figure 5:
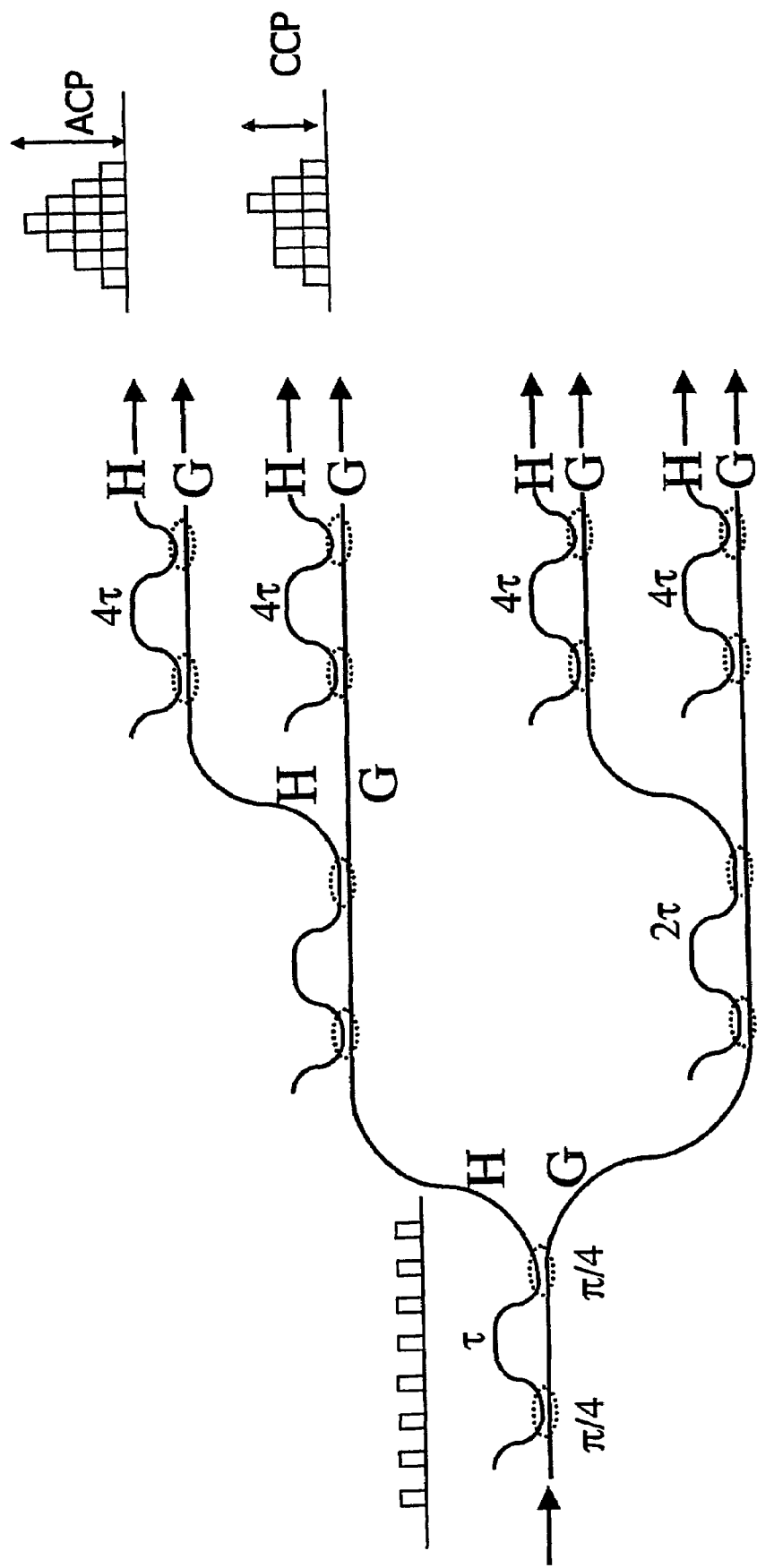
FIG. 5 shows the application of the device of FIG. 3 as optical code processor.

In fact, as shown in FIG. 5, in case of a MPLS network, the device allows all the correlations to be carried out simultaneously. If an IP packet, made of a photonic label attached to the head (or to the tail) of the payload data signal, is sent to the input of the device of FIG. 3, the output signal at the terminal of the corresponding label coincides with the auto-correlation signal presenting an auto-correlation peak ACP, whereas the signals at the other outputs are the cross-correlation functions assuming a lower value. Therefore, the output signals from the device may be used as signals controlling an optical switcher, to the input of which the IP packet to be routed is applied.

In the same way, if an encoded signal of a CDMA network is sent to the input of the device, at the output terminal corresponding to the employed code the transmitted signal may be obtained, whereas the signals transmitted with the other codes are detected at the other outputs.

In order to correctly discriminate the incoming label it is necessary that the maximum of the cross-correlation signal CCP is much lower than the ACP. Actually, the Hadamard codes generated by the device of FIG. 3 have unequal cross-correlation functions: all the labels have $$ACP=N^2=8^2^2=64,$$

but some of them present a maximum CCP equal to $$CCP=(N-1)^2=7^2=49,$$

as shown in particular in FIG. 6, where FIG. 6a shows an optical signal comprising a data packet at 100 Gbit/sec and a front label having chip pulse duration equal to 5 ps and an interval τ equal to 12,5 ps, whereas FIGS. 6b and 6c show the auto- and cross-correlation signal respectively.

The parameter describing the correlation performances is the ratio r between the maximum CCP and the ACP, and in this case it is equal to $$r=0,77.$$

Therefore, the set of codes presents unsatisfactory performances.

An optimal set of codes is made of optical codes presenting the same auto- and cross-correlation functions. To this end, recalling formulas [9] and [10], it is necessary that all the filters $F_{l,m}$ have the same length (i.e. the same decomposition level l) and are shifted copies of a prototype filter $F_{l,0}$ according to the following formula $$|F_{l,m}(\omega)| = \left|F_{l,0}\left(\omega + \frac{2\pi m}{2^l \tau}\right)\right| \quad [11]$$

Since H and G are a pair of QMF filters satisfying the relation $$G(\omega) = e^{-j\omega\tau} H^*\left(\omega + \frac{\pi}{\tau}\right) \quad [12]$$

where asterisk indicates the complex conjugation, the condition [11] is automatically satisfied for l=1. For l>1 it is possible to reverse the decomposition scheme of FIG. 3, by letting the delay decrease from the root to the terminals of the tree, and to add constant phase shifter in order to satisfy condition [11].

Figure 7:
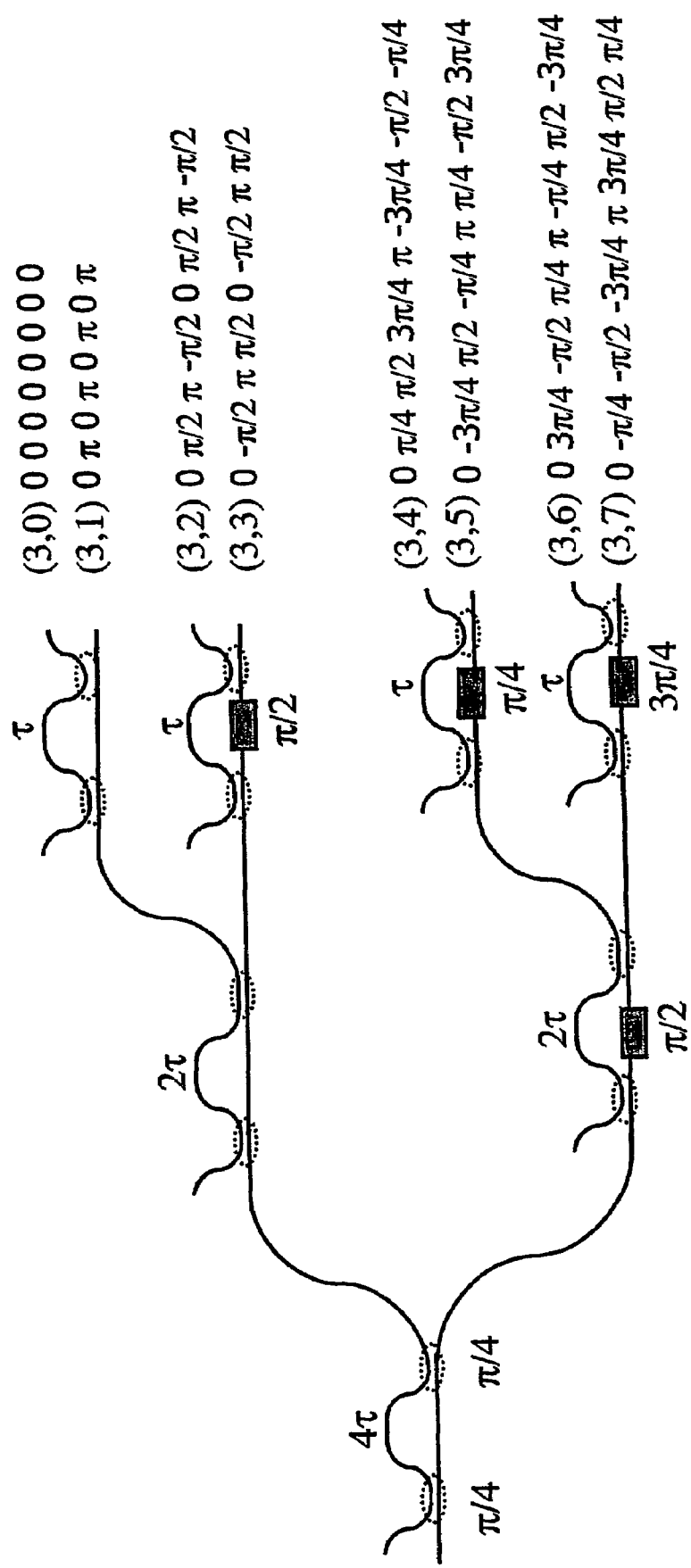
FIG. 7 shows a second embodiment of the optical device according to the invention.

A second embodiment of the device according to the invention apt to generate an optimal code set is shown in FIG. 7. It generates eight phase PSK labels, all having ACP=64, maximum CCP=6,83, and r=0,107, as shown in FIG. 8, where FIG. 8a shows an optical signal comprising a data packet at 100 Gbit/sec and a front optical code having chip pulse duration equal to 5 ps and an interval τ equal to 12,5 ps, whereas FIGS. 8b and 8c show the auto- and cross-correlation signals, respectively. In particular, in order to implement a similar optimal encoder/decoder with N outputs, N-1 MZI interferometers and some phase shifters are needed.

Figure 9:
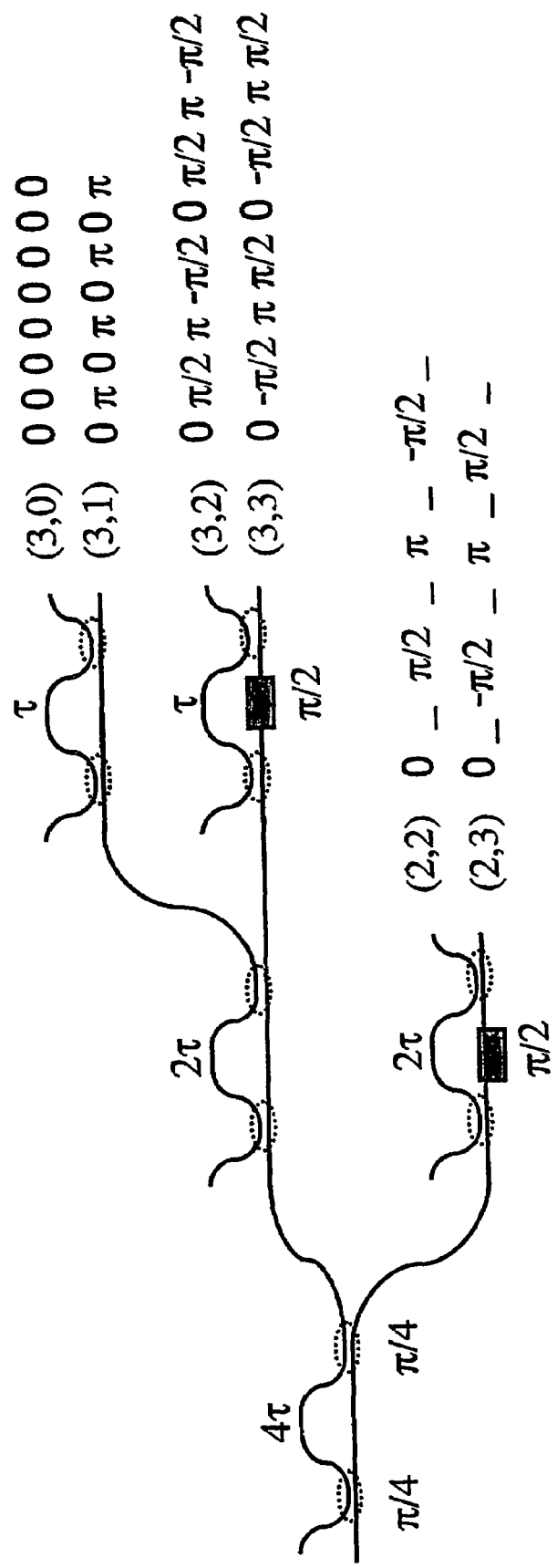
FIG. 9 shows a third embodiment of the optical device according to the invention.

Also in this case, it is possible to prune the tree if the number of the active users is lower than N. Moreover, all the generated codes have the same length. For instance, FIG. 9 shows a third embodiment of the device according to the invention obtained from the one of FIG. 7 by pruning the last two pairs of QMF filters. The device of FIG. 9 generates N=6 labels having the same length equal to 8. The labels generated at terminals (3,0) (3,1) (3,2) and (3,3) have ACP=64, whereas the labels generated at terminals (2,2) and (2,3) have ACP=16; all the labels have maximum CCP=2.

Figure 1A:
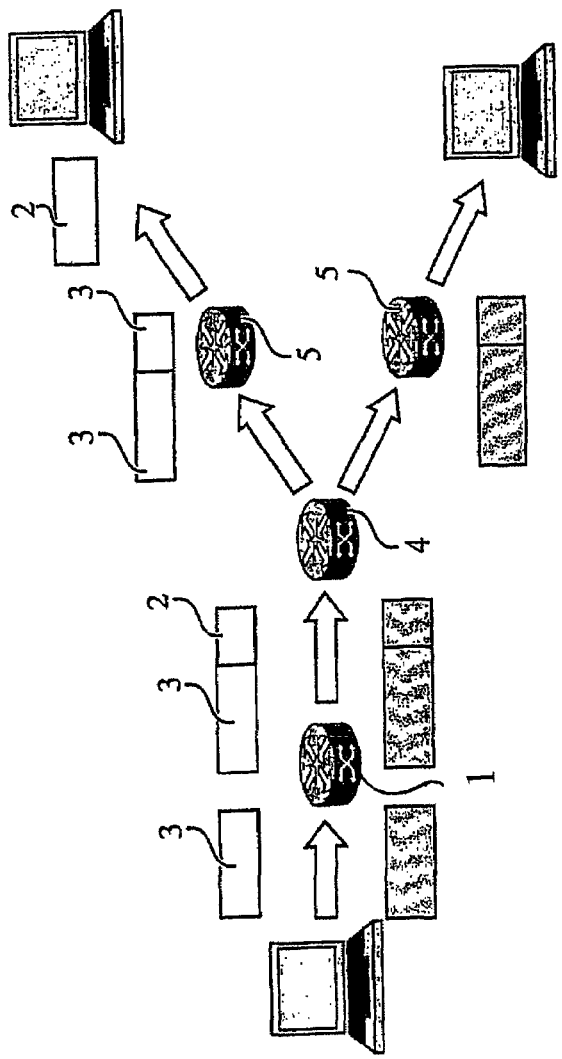
FIGS. 1a and 1b schematically show a MPLS network and a CDMA network, respectively.

FIG. 10a schematically shows a portion of the MPLS network of FIG. 1a wherein the device 6 of FIG. 7 is employed in both an input node 1 and a router node 4, where it controls an optical switcher 13.

Figure 1B:
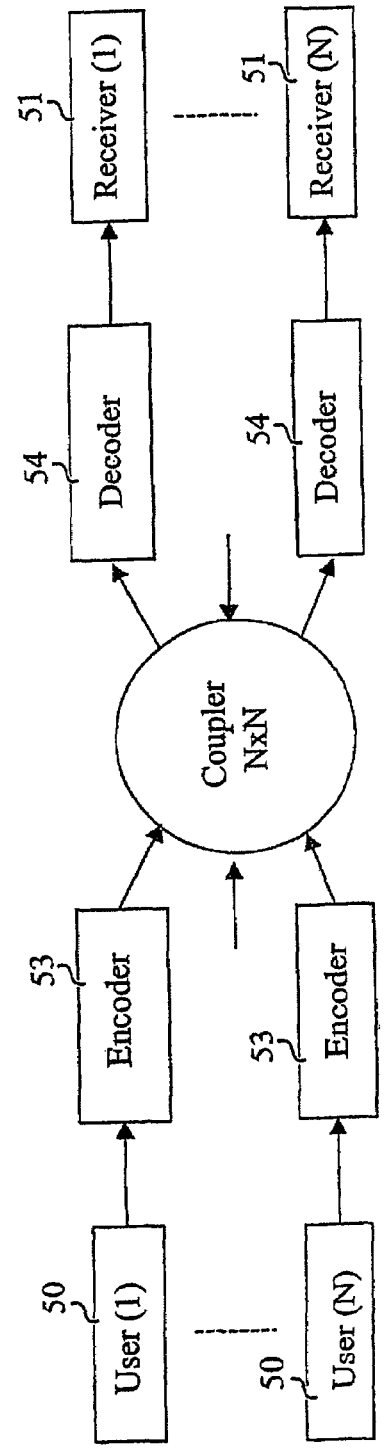

Instead, FIG. 10b shows the CDMA network of FIG. 1b wherein a sole device 6, as the one of FIG. 7, is employed for a plurality of transmission nodes 53, for encoding data of the N users with different codes, and a similar sole device 6' is employed for a plurality of receiving nodes 54, for decoding the N received signals.

Figure 11:
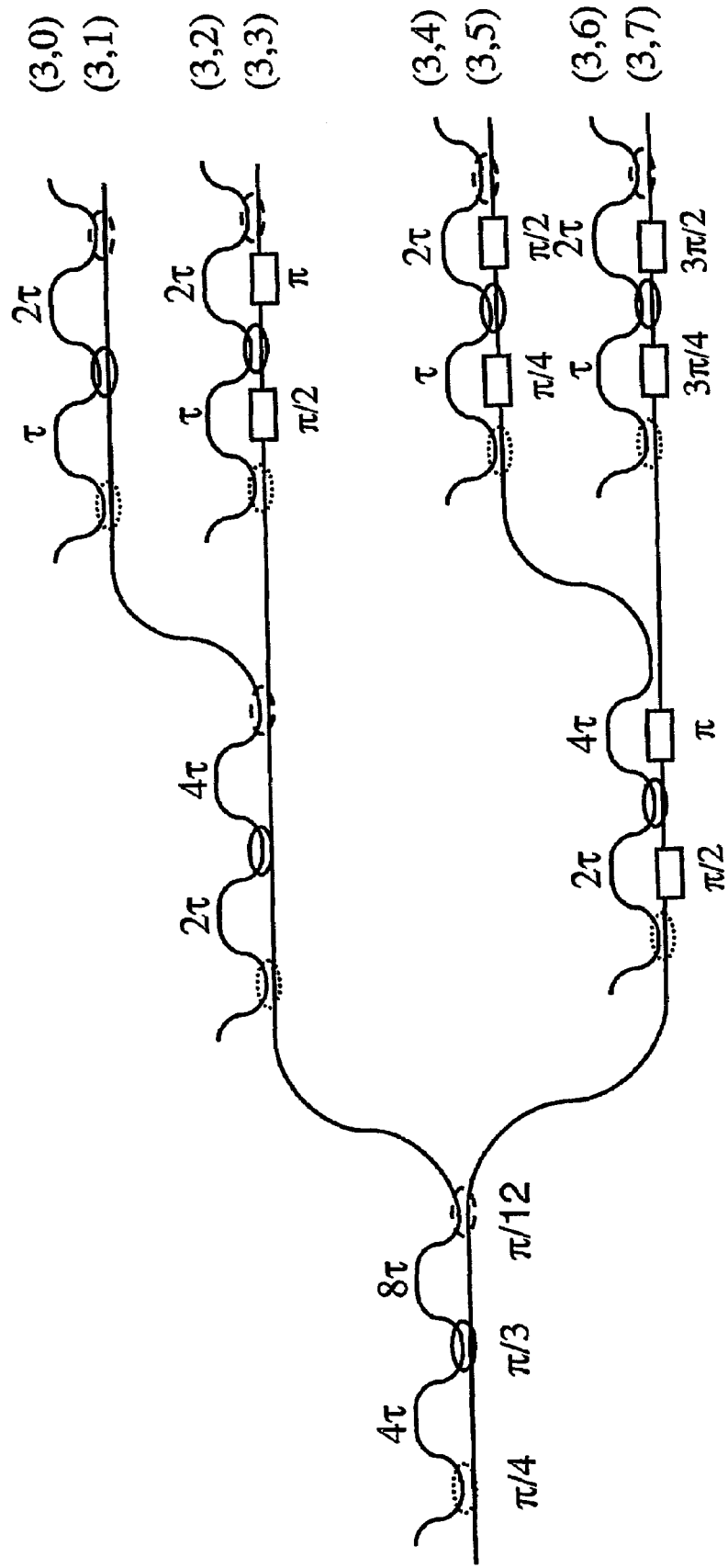
FIG. 11 shows a fourth embodiment of the optical device according to the invention.

Code orthogonality performances may be further enhanced by increasing N. However, it is possible to generate code sequences with very good correlation properties without modifying the number of users N, by increasing the length M of each QMF filter. By way of example and not by way of limitation, a fourth embodiment of the device according to the invention, implementing a full tree of Daubechies wavelet filters having length M=4, is shown in FIG. 11. The device generates N=8 optical codes of length equal to 22, and the photonic labels are made of chip pulses with unequal amplitudes and phases. Each code has ACP=13,5, maximum CCP=1,55, and r=0,114.

Figure 12:
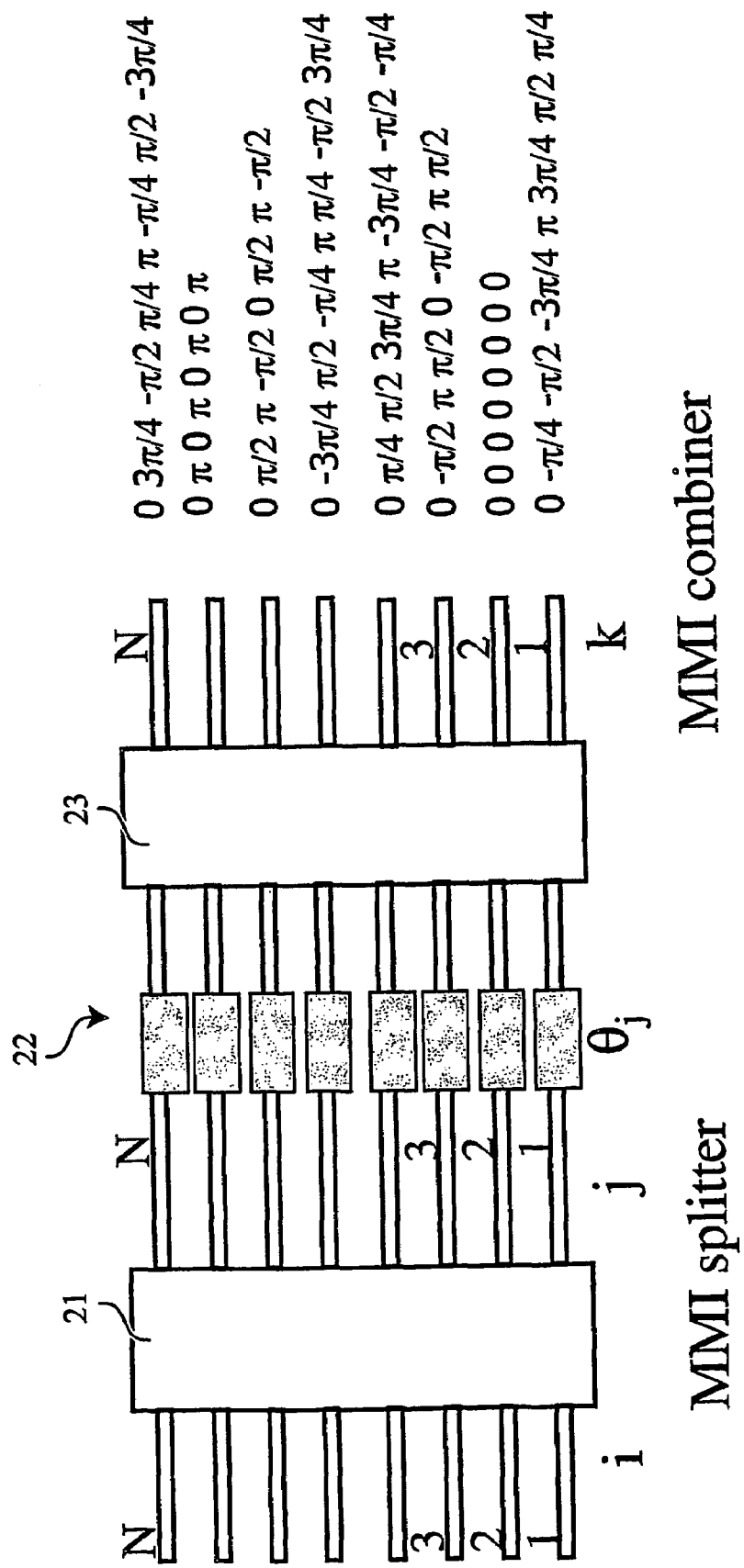
FIG. 12 schematically shows a fifth embodiment of the optical device according to the invention.

A fifth embodiment of the device according to the invention, apt to generate the same optical codes of the device of FIG. 7, is shown in FIG. 12. It comprises two Multi Mode Interference or MMI couplers 21 and 23, a grating 22 of N waveguides and N optical phase shifters. In particular, the device of FIG. 12 has N inputs and N outputs. In the following the input ports i, the output ports k and the grating arms j are all referred to by numbers from 1 to N upwardly.

The first MMI coupler 21 is a N×N uniform power splitter, i.e. it is a waveguide supporting a large number of modes on the transverse direction and it is unimodal along the vertical axis, which is connected to N incoming single-mode waveguides and to N outgoing single-mode waveguides. Due to the self-imaging property of multimode waveguides, a field distribution at any one of the inputs is reproduced at the output plane in N images, that have equal amplitudes and different phases.

Figure 13:
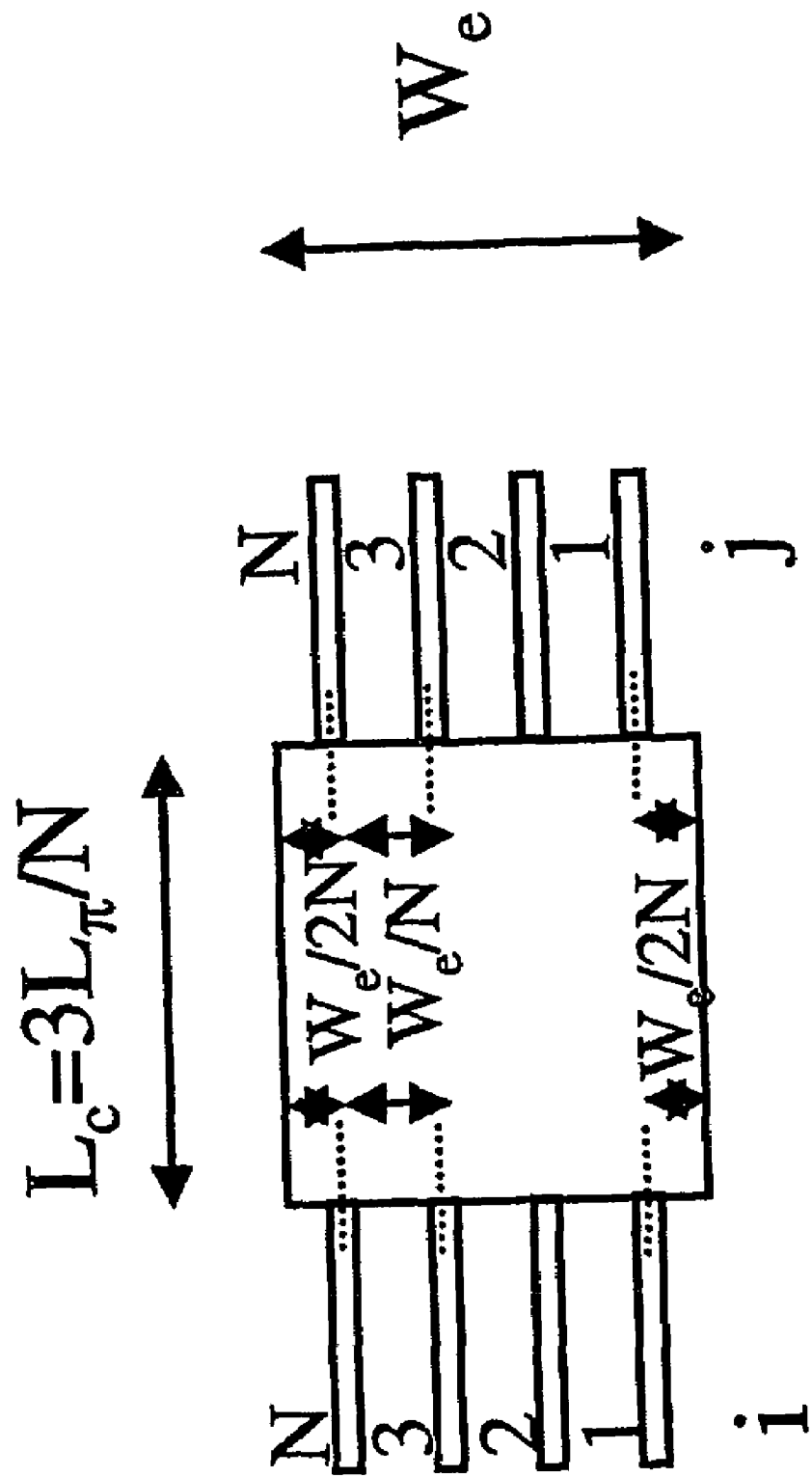
FIG. 13 schematically shows a N×N MMI coupler of the device of FIG. 12.

In order to generate N images, it is necessary that the MMI coupler 21 has a length $L_c=M3L_\pi/N$, where M and N are any two positive integer numbers without a common divisor larger than 1 and $$L_\pi = \frac{\pi}{\beta_0 - \beta_1} = \frac{4n_g W_e^2}{3\lambda} \quad [13]$$

where $\beta_0$ and $\beta_1$ are the propagation constants of the zeroth and first order modes, respectively, $n_g$ is the (effective) refractive index, and λ is the free space wavelength. $W_e$ is the effective width of the fundamental transverse mode, which is slightly larger than the actual guide (or slab) width W, so as to take the lateral penetration depth of each single mode field into account; for high-contrast waveguides, it may be assumed that $W_e \approx W$. In most practical applications, integrated optical devices should be as short as possible, and for the MMI coupler 21 it may be assumed that M=1. FIG. 13 schematically shows a N×N MMI coupler as the ones of FIG.

12. The incoming and outgoing waveguides are placed at equally spaced positions:

$$x_i = (2i-1)\frac{W_e}{2N} \quad i = 1, 2, \ldots N \qquad [14]$$

$$x_j = (2j-1)\frac{W_e}{2N} \quad j = 1, 2, \ldots N$$

The phases $\phi_{ij}$ associated with imaging from input i to output j are:

$$\varphi_{ij} = \phi_1 - \frac{\pi}{2}(-1)^{i+j+N} + \frac{\pi}{4N} \qquad [15]$$
$$\left[i+j-i^2-j^2+(-1)^{i+j+N}\left(2ij-i-j+\frac{1}{2}\right)\right]$$

for $i, j = 1, 2, \ldots N$ with $$\phi_1 = -\beta_0 \frac{3L_\pi}{N} - \frac{9\pi}{8N} + \frac{3\pi}{4} \qquad [16]$$

Formula [15] shows that $\phi_{ij} = \phi_{ji}$, thanks to the symmetry of the device, since input ports and output ports may be used interchangeably. Hence, the impulse response $h_{ik}(t)$ from the input i to the output k coincides with the impulse response $h_{i'k'}(t)$ from the input i' to the output k' when i'=k e k'=i.

An optical pulse at any input of the ports of the MMI coupler 21 is reproduced at all the outputs of the coupler and distributed to the waveguides of the grating 22, which have different lengths. Hence, the pulses travel different paths in the arms of the grating 22 and delayed copies of the pulse are then combined together by the following MMI coupler 23. Therefore, the impulse response of the device from the input i to the output k is equal (except for a constant phase factor and possibly also for a constant amplitude factor) to $$h_{ik}(t) = \sum_{j=1}^{N} e^{j(\varphi_{ij}+\varphi_{jk}+\theta_j)}\delta\left(t - \frac{n_e L_j}{c}\right) \quad i, k = 1, 2, \ldots N \qquad [17]$$

where $j=\sqrt{-1}$, $\delta$ is the Dirac delta function, $\theta_j$ is a constant phase shift introduced by the j-th phase shifter. Moreover, $L_j$ is the length of the j-th arm of the grating 22 and $n_e$ is the corresponding (effective) refractive index.

In order to generate optical codes made of equally spaced chips, it is necessary that the lengths $L_j (j=1, 2 \ldots N)$ of the arms of the grating 22 satisfy the condition $$L_j = L_m + d_j \Delta L \; j=1, 2, \ldots N \qquad [18]$$

with the integer numbers $d_j \in [0, 1, 2, \ldots N-1]$ satisfying the condition $d_j \neq d_{j'}$ if $j \neq j'$.

$L_m$ is the length of a reference waveguide of the grating 22, which is assumed to be the shortest ($d_m=0$), and $\Delta L$ is the minimum difference between the lengths of two waveguides of the grating 22. Although in the most general configuration the lengths of the grating do not linearly increase with j, it is necessary that the factors $d_j$ of the arms of the grating 22 are all different and completely cover the interval $[0 \div N-1]$.

The impulse response from the input i to the reference output m is equal to $$h_{im}(t) = \sum_{j=1}^{N} e^{j(\varphi_{ij}+\varphi_{jm}+\theta_j)}\delta\left(t - \frac{n_e L_j}{c}\right) \quad i = 1, 2, \ldots N \qquad [19]$$

and the optical code at the output m is a sequence of N PSK chips with equal amplitudes and different phases. The values $\theta_j$ of the phase shifters have to be chosen so that the reference code is made of chips all having equal phases, i.e.

$$\phi_{ij} + \phi_{jm} + \theta_j = 2\pi A_{ijm} \; i, j=1, 2, \ldots N \qquad [20]$$

where $A_{ijm}$ are integer constants.

For any fixed input i and reference output m, it is possible to compute the values of the phase shifts $\theta_j$ starting from formula [20].

If the optical codes at the outputs k and k' are orthogonal, the cross-correlation function of the corresponding impulse responses is about zero:

$$h_{ik}(t) \otimes h_{ik'}(t) \cong 0 \; i, k, k'=1, 2, \ldots N \text{ and } k \neq k' \qquad [21]$$

The transfer function $H_{ik}(f)$ from the input i to the output k may be computed by carrying out the Fourier transform of the impulse response [17]:

$$H_{ik}(f) = \sum_{j=1}^{N} e^{j(\varphi_{ij}+\varphi_{jk}+\theta_j)} e^{-j\frac{2\pi f n_e L_j}{c}} \quad i, k = 1, 2, \ldots N \qquad [22]$$

In the frequency domain relation [21] becomes $$H^*_{ik}(f) H_{ik'}(f) \cong 0 \; i, k, k'=1, 2, \ldots N \text{ and } k \neq k' \qquad [23]$$

This condition is always satisfied if the transfer functions are translated copies of the reference transfer function $H_{im}(f)$, i.e. they are equal to:

$$H_{ik}(f) = H_{im}\left(f - n\frac{c}{n_e N \Delta L}\right) \; k = 1, 2, \ldots N \qquad [24]$$

where n is an integer number which satisfies the condition that the values corresponding to two different outputs are different:

$$k \neq k' \rightarrow n \neq n' \; k, k'=1, 2, \ldots N \qquad [25]$$

An optical code set, wherein all the optical codes have identical auto- and cross-correlation functions, may be generated by translating the Fourier transform of a reference code in the frequency domain. By making use of formula [20], the transfer function between the input i and the reference output m is equal to $$H_{im}(f) = \sum_{j=1}^{N} e^{-j\frac{2\pi f n_e L_j}{c}} \quad i = 1, 2, \ldots N \qquad [26]$$

and by substituting it in formula [24] it is obtain as result $$H_{ik}(f) = \sum_{j=1}^{N} e^{-j\frac{2\pi f n_e L_j}{c}} e^{j\frac{2\pi n L_j}{N\Delta L}} \quad i, k = 1, 2, \ldots N \quad [27]$$

From the comparison of formulas [22] and [27], it may be seen that the OC are orthogonal if the following conditions is satisfied:

$$\varphi_{ij} + \varphi_{jk} + \theta_j = \frac{2\pi n L_j}{N\Delta L} + 2\pi A_{jmk} \quad i, j, k = 1, 2, \ldots N \quad [28]$$

By using formulas [18] and [20], it is $$\varphi_{jk} - \varphi_{jm} = \frac{2\pi n L_m}{N\Delta L} + \frac{2\pi n d_j}{N} + 2\pi A_{jmk} \quad j, k = 1, 2, \ldots N \quad [29]$$

and by putting j=m, it is obtained $$\varphi_{mk} - \varphi_{mm} = \frac{2\pi n L_m}{N\Delta L} \quad k = 1, 2, \ldots N \quad [30]$$

which, substituted in formula [29], gives $$\Delta\varphi_{jk} \equiv \varphi_{jk} - \varphi_{jm} - \varphi_{mk} + \varphi_{mm} = \frac{2\pi n d_j}{N} + 2\pi A_{jmk} \quad [31]$$

$$j, k = 1, 2, \ldots N$$

In particular, it is $\Delta\phi_{jm}=0$.

The phase difference may be computed from formula [15], obtaining $$\Delta\varphi_{jk} = \frac{2\pi(-1)^N}{N} A_j A_k - \frac{\pi(-1)^N}{2} A_{jk} \quad j, k = 1, 2, \ldots N \quad [32]$$

with $$A_q = \frac{1}{2}\left[(-1)^{q+m}\left(q - \frac{1}{2}\right) - \left(m - \frac{1}{2}\right)\right] \quad \text{per } q = k, j$$

$$A_{jk} = [1 - (-1)^{j+m} - (-1)^{k+m} + (-1)^{j+k}]$$

where $A_q$ is an integer, whereas $A_{jk}$ is an integer multiple of 4. Therefore condition [31] may be expressed as:

$$n = (-1)^N A_k \quad k = 1, 2, \ldots N \quad [33]$$
$$= \left\{\frac{(-1)^N}{2}\left[(-1)^{k+m}\left(k - \frac{1}{2}\right) - \left(m - \frac{1}{2}\right)\right]\right\}$$
$$d_j = A_j \quad j = 1, 2, \ldots N$$
$$= \left\{\frac{1}{2}\left[(-1)^{j+m}\left(j - \frac{1}{2}\right) - \left(m - \frac{1}{2}\right)\right]\right\} \bmod \cdot N$$

-continued $$A_{jmk} = -\frac{(-1)^N}{4} A_{jk} \quad k, j = 1, 2, \ldots N$$
$$= -\frac{(-1)^N}{4}[1 - (-1)^{j+m} - (-1)^{k+m} + (-1)^{j+k}]$$

where "mod" indicates the module arithmetic operator, so that $d_j \in [0, 1, 2, \ldots N-1]$.

Formulas [33] give the rules for implementing the fifth embodiment of the device shown in FIG. 12. In particular, the first formula [33] gives the relative phase shift between the optical code at the reference output m and the optical code at the output k; the second formula [33] gives the factors $d_j$ and thus the lengths of the arms $L_j$ of the waveguide grating 22. The transfer function from the input i to the output k is:

$$H_{ik}(f) = \sum_{j=1}^{N} e^{-j\frac{2\pi f n_e L_j}{c}} e^{j\frac{2\pi n L_j}{N\Delta L}} = \sum_{j=1}^{N} e^{-j\frac{2\pi f n_e L_j}{c}} e^{j\frac{2\pi n L_m}{N\Delta L}} e^{j\frac{2\pi n d_j}{N}} \quad [34]$$

$$i, k = 1, 2, \ldots N$$

For sake of simplicity, it is possible to choose the reference length $L_m = N\Delta L$, so that the transfer function [34] becomes $$H_{ik}(f) = \sum_{j=1}^{N} e^{-j\frac{2\pi f n_e L_j}{c}} e^{j\frac{2\pi n d_j}{N}} \quad i, k = 1, 2, \ldots N \quad [35]$$

and the phases of the OCs at the output k are multiple of $2\pi/N$. In this case, from formula [30] it is $$\phi_{mk} = \phi_{mm} \quad k=1, 2, \ldots N \quad [36]$$

and the OCs generated by the device of FIG. 12 coincide with the ones generated by the device of FIG. 7.

By way of example and not by way of limitation, in the case where the device of FIG. 12 has N=8 inputs and N=8 outputs, assuming that the reference output is m=2 and that the input port is i=4, from formulas [33] it results that the factors of the arms of the grating 22 are $d_j$=(7 0 6 1 5 2 4 3), whereas the values of the phase shifters according to formula [20] are:

$$\theta_j = -2\phi_1 - (13\pi/32\ 29\pi/32\ -19\pi/32\ 29\pi/32\ -3\pi/32$$
$$13\pi/32\ -3\pi/32\ -19\pi/32).$$

The reference code at the output m=2 has all the phases equal to zero, whereas the codes generated at the other outputs are the ones reported in FIG. 12, identical to the ones generated by the device of FIG. 7.

According to formula [33], the factors of the arms of the grating 22 do not increase with j monotonically, and, in order to avoid crossing of the planar guides, it is necessary either to insert multiple U bends into the layout or to use an S configuration. Alternatively, it is possible to establish the condition that $d_j=\alpha_j$, with α integer. In this case, the factors $d_j$ of the grating 22 are equal to:

$$\frac{2\alpha j - \frac{1}{2}}{j - \frac{1}{2}} = (-1)^{j+m} \quad j = 1, 2, \ldots N \quad [37]$$

which is always satisfied for j even and α=2. Therefore, if only even inputs are considered, even outputs and arms of the waveguide grating 22 with even index, the device of FIG. 12 may be implemented with the lengths of the arms of the grating 22 monotonically increasing with j.

It is immediate for those skills in the art to adapt the device of FIG. 12 to the case where the first MMI coupler is a 1×N non uniform splitter with a sole input and N outputs.

Other embodiments of the device according to the invention may comprise a tree structure in the nodes of which devices similar to the ones of FIG. 12 are present; in such case, it is possible to generate a code set with a very high cardinality.

Figure 14:
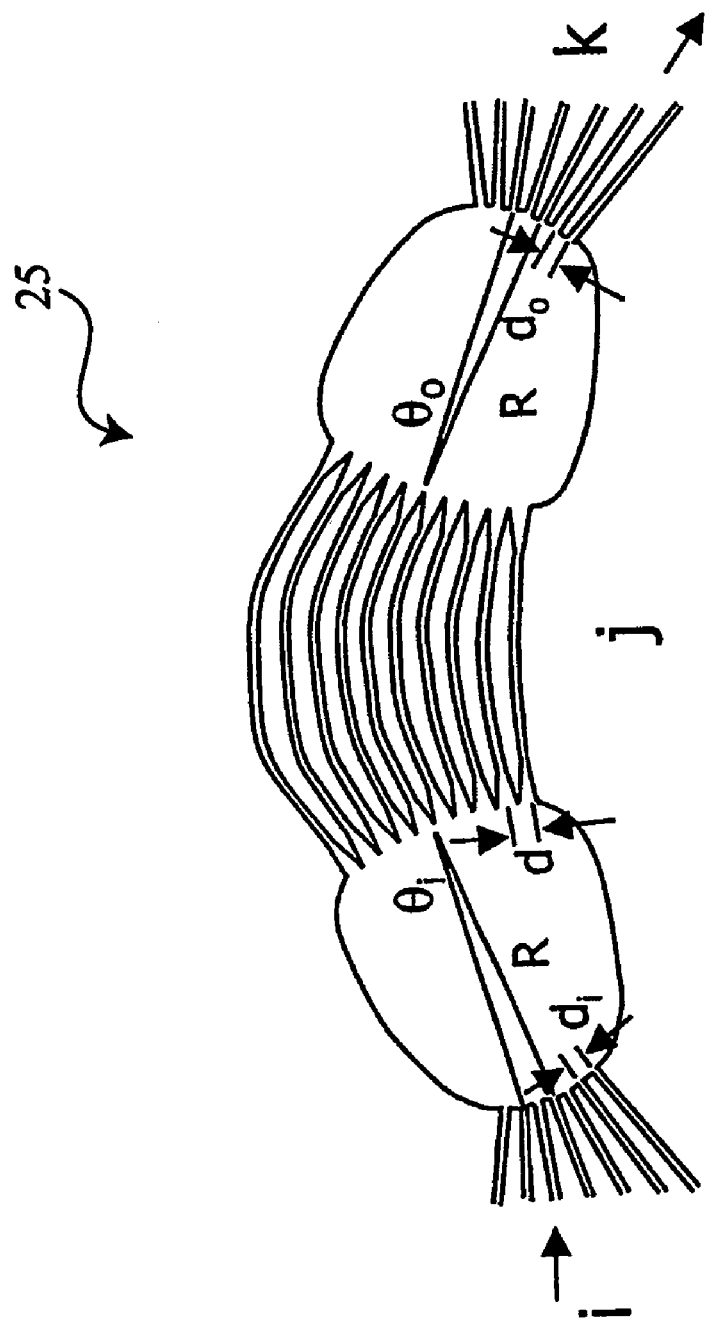
FIG. 14 schematically shows a sixth embodiment of the optical device according to the invention.

FIG. 14 shows a sixth embodiment of the device according to the invention using a waveguide grating and two focusing couplers or "slabs". In particular, the device 25 of FIG. 14 comprises N input waveguides, N output waveguides, two coupling waveguides and a waveguide grating. The waveguides at the input and output of each coupler are located according to the Rowland circle construction, whereas the length of two adjacent waveguides in the grating varies by a constant ΔL.

The transfer function between the input i and the output k is equal (except for a constant phase factor and possibly also for a constant amplitude factor) to:

$$H_{ik}(f) = \sum_{j=1}^{N} e^{-j\frac{2\pi f j n_e \Delta L}{c}} e^{-j\frac{2\pi f n_s dj}{c}(\sin\theta_i + \sin\theta_o)} \quad i, k = 1, 2, \ldots N \quad [38]$$

where $n_s$ and $n_e$ are, respectively, the effective refractive indexes of the slabs and of the grating waveguides; d is the pitch of the waveguide grating, and $\theta_i$ and $\theta_o$ are the angles subtended by the input and output waveguides, respectively, i.e.

$$\sin\theta_i \cong i\frac{d_i}{R} \quad [39]$$
$$\sin\theta_o \cong k\frac{d_o}{R}$$

The pitches of the input and output waveguide gratings are indicated with $d_i$ and $d_o$, respectively, whereas R is the slab focal length. Assuming that $d_i = d_o$, and choosing the layout parameters so that $$N = \frac{\lambda R}{n_s d d_o} \quad [40]$$

from formulas [38] and [39] it is obtained $$H_{ik}(f) = \sum_{j=1}^{N} e^{-j\frac{2\pi f j n_e \Delta L}{c}} e^{-j\frac{2\pi j}{N}(i+k)} \quad [41]$$

$$i, k = 1, 2, \ldots N$$

For each input i, a reference output waveguide may be defined which is given by m=N−i if i≠N and m=N if i=N. The reference transfer function is equal to $$H_{im}(f) = \sum_{j=1}^{N} e^{-j\frac{2\pi f j n_e \Delta L}{c}} \quad [42]$$

$$i = 1, 2, \ldots N$$

and the related impulse response is equal to $$h_{im}(t) = \sum_{j=1}^{N} \delta(t - j\tau) \quad [43]$$

$$i = 1, 2, \ldots N$$

where $\tau = \Delta L n_e / c$ is the chip period of the optical codes.

In such a way, the device 25 of FIG. 14 generates the same codes generated by the devices of FIGS. 7 and 12. In fact, the transfer function from the input i to the output k is a translated version of the reference function $$H_{ik}(f) = H_{im}\left(f - \frac{i+k}{N\tau}\right) \quad i, k = 1, 2, \ldots N \quad [44]$$

Further embodiments of the device according to the invention allow the code cardinality to be increased without increasing the code length, by encoding the labels on different wavelengths, by using a variable wavelength or tunable laser source as source of the single input chip.

Another way for increasing the code cardinality, without increasing the code length, is the generation of multi-dimensional codes. In fact, by sending two or more pulses at the same wavelength into the inputs of the devices of FIG. 12 or FIG. 14, N orthogonal optical codes are obtained. Since the number of possible input configurations is larger, it is possible to build a larger set of orthogonal optical codes.

Called n the number of inputs into which a pulse is sent, with n<N, the cardinality of the set of generated codes increases up to $$\binom{N}{n},$$

whereas the code length remains equal to N. The maximum number of OCs of length N which may be generated by using a multidimensional configuration is equal to $$\binom{N}{N/2},$$

which is obtained by considering n=N/2 inputs.

By way of example, with N=8, the code cardinality of 4-dimensional OCs is 70.

As a further example, by considering two identical pulses at the same wavelength sent into the inputs $i_1$ and $i_2$ of the device of FIG. 14, the transfer function at the output k is equal to:

$$H_k(f) = H_{i_1k}(f) + H_{i_2k}(f) \quad [45]$$

$$= \sum_{j=1}^{N} e^{-j2\pi jf\tau} e^{-j\frac{2\pi j}{N}(i_1+k)} + \sum_{j=1}^{N} e^{-j2\pi jf\tau} e^{-j\frac{2\pi j}{N}(i_2+k)}$$

$$= H_{i_1m_1}\left(f - \frac{i_1+k}{N\tau}\right) + H_{i_1m_1}\left(f - \frac{i_2+k}{N\tau}\right)$$

$$k = 1, 2, \ldots N$$

where $m_1$ is the reference output corresponding to $i_1$, that is $m_1=N-i_1$ if $i_1\neq N$ and $m_1=N$ if $i_1=N$. The corresponding impulse response is equal to:

$$h_k(t) = \sum_{j=1}^{N} \left(e^{-j\frac{2\pi j}{N}(i_1+k)} + e^{-j\frac{2\pi j}{N}(i_2+k)}\right)\delta(t-j\tau) =$$

$$2\sum_{j=1}^{N} e^{-j\frac{2\pi j}{N}\left[k+\frac{(i_1+i_2)}{2}\right]} \cos\left[\frac{\pi j(i_1-i_2)}{N}\right]\delta(t-j\tau)$$

so that the OCs generally have unequal amplitudes and phases. In particular, if $i_1-i_2=N/2$, OCs of length N are generated which are made only of even chip pulses with the same amplitudes.

When the device is used as label processor in a router node, if a label is sent to the input port i=k, two auto-correlation signals are at the outputs k=$i_1$ and k'=$i_2$, due to the device reciprocity. Therefore, for a multi-dimensional OC set the exact match between two codes is detected by measuring the simultaneous presence of two or more auto-correlation peaks. For a two-dimensional code set with N=8, it is ACP=16, and maximum CCP=3, so that r=0.187, slightly worst than the case of one-dimensional OCs.

The advantages given by the optical device and by the optical code set according to the present invention are evident, for instance in applications related to MPLS networks and to CDMA networks.

In particular, the same device may be used as both encoder and decoder: by suitably selecting the device output a different optical code is selected.

With regard to the use of optical codes according to the present invention in multiple access networks, the same considerations concerning MPLS networks apply. In particular, the signals of the N users are received with multiple access interference or MAI substantially null, since the proposed optical codes are highly orthogonal.

The preferred embodiments have been above described and some modifications of this invention have been suggested, but it should be understood that those skilled in the art can make other variations and changes, without so departing from the related scope of protection, as defined by the following claims.

The invention claimed is:

1. An optical device, comprising:
P inputs s, with $1 \leq s \leq P$, and $P \geq 1$, and
N outputs k, with $1 \leq k \leq N$ and $N \geq 1$, wherein the optical device is adapted to generate and process optical codes at at least one wavelength, the optical device is adapted to simultaneously generate and process $N_c$ phase and/or amplitude optical codes at one or more wavelengths, with $N_c \geq 2$, made of C chips with time interval $\tau$, with $C \geq 2$, wherein a transfer function $T_{sk}(f)$ from the input s to the output k satisfies the following formula:

$$|T_{sk}(f)| = \prod_{v=0}^{V-1} \left|F_v\left(a_v f + \frac{S_{sk}}{N_k\tau}\right)\right|,$$

for $s = 1, 2 \ldots P$ $k = 1, 2, \ldots N$ where:
$F_v(f)$ is a transfer function of an optical filter, for v=0, 1, ..., V−1,
$a_v$ is a constant value, for v=0, 1, ..., V−1,
$S_{sk}$ is an integer number ($S_{sk} \in Z$),
$N_k$ is a constant value, for k=1, 2, ... N, and
V is a positive integer number with $1 \leq V \leq \log_2 N$.

2. The device according to claim 1, wherein the number C of chips of said optical codes is larger than or equal to the number N of outputs k:

$C \geq N$.

3. The device according to claim 1, wherein the number $N_c$ of optical codes which it is apt to simultaneously generate and process is larger than or equal to the number N of outputs k:

$N_c \geq N$.

4. The device according to claim 1, wherein $N_k$ is an integer constant value, for k=1, 2, ... N.

5. The device according to claim 1, wherein the number P of inputs s is equal to 1:

P=1.

6. The device according to claim 1, wherein the device further comprises at least one tree having at least one node comprising a first coupler (21), including $N_{IN}$ input waveguides and $N_a$ output waveguides, with $N_{IN} \geq 1$ and $N_a \geq 1$, the outputs of which are connected to a grating (22) including $N_a$ waveguides, which are in turn connected to $N_a$ input waveguides of a second coupler (23), including $N_{OUT}$ output waveguides, where $N_{OUT} \geq 1$.

7. The device according to claim 6, wherein $N_{IN}=N_a=N_{OUT}$.

8. The device according to claim 6, wherein a constant optical phase shifter of value $\theta_j$ is inserted along at least one of the waveguides j of the grating (22) with j=1, 2, ... $N_a$.

9. The device according to claim 6, wherein the lengths $L_j$, with j=1, 2, ... $N_a$, of the waveguides of the grating (22), with j=1, 2 ... $N_a$, are equal to ([18])

$L_j=L_m+d_j\Delta L$ j=1,2, ... $N_a$ with the integer number $d_j \in [0, 1, 2, \ldots N_a-1]$ satisfying the condition $d_k \neq d_{k'}$ if $k \neq k'$, where $L_{m'}$ is the length of a reference waveguide, equal to the shortest waveguide, whereby $d_{m'}=0$, and $\Delta L$ is the minimum difference between the lengths of two waveguides of the grating (22).

10. The device according to claim 9, wherein ([33])

$$d_j = \left\{ \frac{1}{2} \left[ (-1)^{j+m} \left( j - \frac{1}{2} \right) - \left( m' - \frac{1}{2} \right) \right] \right\} \bmod N_a$$
$$m', j = 1, 2, \ldots N_a$$

where "mod" indicates the arithmetical module operator.

11. The device according to claim 6, wherein $d_j=2j$ with $j=1, 2, \ldots, N_a$, where only the even inputs $i(i=2r$, for $r=1, 2, \ldots, \text{int}[N_{IN}/2]$), where "int" indicates the arithmetical operator giving the integer quotient of a division) and the even outputs $k(k=2r'$, for $r'=1, 2, \ldots, \text{int}[N_{OUT}/2])$ are used.

12. The device according to claim 6, wherein the first coupler is a uniform Multi Mode Interference or MMI coupler (21).

13. The device according to claim 12, wherein the first MMI coupler (21) has a length $$L_c = M_c 3 L_\pi / N_a,$$

where $M_c$ is a positive integer number, and ([13])

$$L_\pi = \frac{\pi}{\beta_0 - \beta_1} = \frac{4 n_g W_e^2}{3\lambda}$$

where
- $\beta_0$ and $\beta_1$ are propagation constants of the zeroth and first order modes, respectively,
- $n_g$ is the effective refractive index,
- $\lambda$ is the free space wavelength of the input radiation, and
- $W_e$ is the effective width of the fundamental transverse mode, the device being further characterised in that, assuming that the first MMI coupler input waveguides are identified by an index i which increases according to a transverse direction and that the output waveguides are identified by an index j' which increases according to said same transverse direction, the input waveguides i and the output waveguides j' are located, respectively, in positions $x_i$ and $x_{j'}$ equal to ([14]):

$$x_i = (2i - 1) \frac{W_e}{2 N_{IN}} \quad i = 1, 2, \ldots N_{IN}$$
$$x_{j'} = (2j' - 1) \frac{W_e}{2 N_a} \quad j' = 1, 2 \ldots N_a$$

14. The device according to claim 13, wherein $M_c$ and $N_a$ are two positive integer numbers without a common divisor larger than 1.

15. The device according to claim 13, wherein $M_c=1$.

16. The device according to claim 6, wherein the first coupler is a non uniform power splitter MMI coupler (21).

17. The device according to claim 6, wherein the second coupler is a uniform MMI coupler (23).

18. The device according to claim 17, wherein the second MMI coupler (23) has a length $$L'_c = M'_c 3 L'_\pi / N_{OUT},$$

where $M'_c$ is a positive integer number and ([13])

$$L'_\pi = \frac{\pi}{\beta'_0 - \beta'_1} = \frac{4 n'_g W_e'^2}{3\lambda}$$

where
- $\beta'_0$ and $\beta'_1$ are propagation constants of the zeroth and first order modes, respectively,
- $n'_g$ is the effective refractive index,
- $\lambda$ is the free space wavelength of the input radiation, and
- $W'_e$ is the effective width of the fundamental transverse mode, and, assuming that the second MMI coupler input waveguides are identified by an index j" which increases according to a transverse direction and that the output waveguides are identified by an index k which increases according to said same transverse direction, the input waveguides j" and the output waveguides k are located, respectively, in positions $x'_{j''}$ and $x'_k$ equal to ([14]):

$$x'_{j''} = (2j'' - 1) \frac{W'_e}{2 N_a} \quad \text{for } j'' = 1, 2, \ldots, N_a$$
$$x'_k = (2k - 1) \frac{W'_e}{2 N_{OUT}} \quad \text{for } k = 1, 2, \ldots, N_{OUT}$$

19. The device according to claim 18, wherein $M'_c$ and $N_{OUT}$ are two positive integer numbers without a common divisor larger than 1.

20. The device according to claim 18, wherein $M'_c=1$.

21. The device according to claim 18, wherein $$N_{IN} = N_a = N_{OUT},$$

a constant optical phase shifter of value $\theta_j$ being inserted along at least one of the waveguides j of the grating (22) with $j=1, 2, \ldots N_a$, the first MMI coupler having a length $$L_c = M_c 3 L_\pi / N_a,$$

where $M_c$ is a positive integer number, and ([13])

$$L_\pi = \frac{\pi}{\beta_0 - \beta_1} = \frac{4 n_g W_e^2}{3\lambda}$$

where
- $\beta_0$ and $\beta_1$ are propagation constants of the zeroth and first order modes, respectively,
- $n_g$ is the effective refractive index,
- $\lambda$ is the free space wavelength of the input radiation, and
- $W_e$ is the effective width of the fundamental transverse mode, the device being further characterised in that, assuming that the first MMI coupler input waveguides are identified by an index i which increases according to a transverse direction and that the output waveguides are identified by an index j' which increases according to said same transverse direction, the input waveguides i and the output waveguides j' are located, respectively, in positions $x_i$ and $x_{j'}$ equal to ([14]):

$$x_i = (2i - 1) \frac{W_e}{2 N_{IN}} \quad i = 1, 2, \ldots N_{IN}$$

-continued $$x_{j'} = (2j'-1)\frac{W_e}{2N_a} \qquad j' = 1, 2 \ldots N_a$$

the values $\theta_j$ of the phase shifters along the waveguides of the grating (22) being equal to ([20])

$$\phi_{ij} + \phi'_{jm} + \theta_j = 2\pi A_{ikm}$$

for i=1, 2, ..., $N_{IN}$ j=1, 2, ..., $N_a$ m=1, 2, ..., $N_{OUT}$ k=1, 2, ..., $N_{OUT}$
where ([15])

$$\varphi_{ij} = \phi_1 - \frac{\pi}{2}(-1)^{i+j+N_{GRA}} + \frac{\pi}{4N_{GRA}}$$

$$\left[i+j-i^2-j^2+(-1)^{i+j+N_{GRA}}\left(2ij-i-j+\frac{1}{2}\right)\right]$$

with ([16])

$$\phi_1 = -\beta_0 \frac{3M_C L_\pi}{N_{GRA}} - \frac{9\pi}{8N_{GRA}} + \frac{3\pi}{4},$$

and ([20])

$$\varphi'_{jm} = \phi'_1 - \frac{\pi}{2}(-1)^{j+m+N_{GRA}} + \frac{\pi}{4N_{GRA}}$$

$$\left[j+m-j^2-m^2+(-1)^{j+m+N_{GRA}}\left(2jm-j-m+\frac{1}{2}\right)\right]$$

with ([16])

$$\phi'_1 = -\beta'_0 \frac{3M'_C L'_\pi}{N_{GRA}} - \frac{9\pi}{8N_{GRA}} + \frac{3\pi}{4},$$

where
$A_{ikm}$ are integer constants.

22. The device according to claim 6, wherein the second coupler is a non uniform power splitter MMI coupler (23).

23. The device according to claim 6, wherein the absolute value of the transfer function $T_{ik}(f)$ from an input i of the first coupler to the output k of the second coupler is a frequency translated copy of the absolute value of the reference transfer function $T_{im}(f)$, from the input i of the first coupler (21) to an output m of the second coupler (23), so that ([24]):

$$|T_{ik}(f)| = \prod_{v=0}^{V-1}\left|F_v\left(a_v f + \frac{S_{ik}}{N_k \tau}\right)\right| = \left|T_{im}\left(f - n\frac{c}{n_e N_k \Delta L}\right)\right|$$

for $i = 1, 2, \ldots, N_{IN}$  $k, m = 1, 2, \ldots, N_{OUT}$ where:
$F_0(f) = T_{im}(f)$,
c is the light speed,
$a_v = 1$,
$n_e$ is the refractive index of the waveguides of the grating (22),
V=1, and
$S_{sk} = -n$, where n is an integer number satisfying the condition that the values corresponding to two different outputs k e k' are different ([25]):

$$k \neq k' \rightarrow n \neq n' k, k'=1, 2, \ldots, N_{OUT}$$

whereby the time constant $\tau$ is equal to:

$$\tau = \frac{\Delta L \cdot n_e}{c}.$$

24. The device according to claim 23, wherein $N_k = N_{OUT}$ for k=1, 2, ..., $N_{OUT}$.

25. The device according to claim 6, wherein the first coupler is a focusing coupler or "slab".

26. The device according to claim 25, wherein the length of the adjacent waveguides in the grating varies by a constant $\Delta L$.

27. The device according to claim 25, wherein ([40]):

$$N_a = \frac{\lambda R}{n_s d d_o}$$

where:
$\lambda$ is the wavelength of the input optical signal,
R is the focal length of the first and second focusing couplers,
$n_s$ is the effective refractive index of the first and second focusing couplers,
d is the pitch of the waveguide grating, and
$d_o$ is the pitch of the $N_{IN}$ input waveguides and the $N_{OUT}$ output waveguides.

28. The device according to claim 25, wherein, assuming that the $N_{IN}$ input waveguides and the $N_{OUT}$ output waveguides are identified, respectively, by an index i and by an index k which increase according to the same transverse direction, the absolute value of the transfer function $T_{ik}(f)$ from an input i of the first coupler to the output k of the second coupler is a frequency translated copy of the absolute value of a reference transfer function $$T_{im_{REF\_i}}(f),$$

from the same input i to a corresponding reference output $m_{REF\_i}$, with $1 \leq m_{REF\_i} \leq N_{OUT}$, so that ([44]):

$$|T_{ik}(f)| = \prod_{v=0}^{V-1}\left|F_v\left(a_v f + \frac{S_{ik}}{N_k \tau}\right)\right|$$

$$= \left|T_{im_{REF\_i}}\left(f - \frac{i+k}{N_k \tau}\right)\right|$$

$i = 1, 2, \ldots, N_{IN}$  $k = 1, 2, \ldots, N_{OUT}$ where:

$$F_0(f) = T_{im_{REF\_i}}(f),$$

c is the light speed,
$a_v = 1$,
$n_e$ is the refractive index of the waveguides of the grating (22),
V=1,
$S_{sk} = (i+k)$, and the time constant τ is equal to:

$$\tau = \frac{\Delta L \cdot n_e}{c}.$$

29. The device according to claim 28, wherein $N_{IN} = N_a = N_{OUT}$, and in that the index $m_{REF\_i}$ of the reference output waveguide corresponding to the input i is equal to:

$$m_{REF\_i} = \begin{cases} N_{GRA} - i & \text{for } i \neq N_{GRA} \\ N_{GRA} & \text{for } i = N_{GRA} \end{cases} \quad i = 1, 2, \ldots, N_{GRA}$$

30. The device according to claim 28, wherein $N_k = N_{OUT}$ for $k=1, 2, \ldots, N_{OUT}$.

31. The device according to claim 6, wherein the second coupler is a focusing coupler or "slab".

32. The device according to claim 6, wherein the first coupler is a focusing coupler or "slab", the second coupler is a focusing coupler or "slab", and the location of the input and output waveguides on the first coupler and on the second coupler is based on the Rowland circle construction.

33. A communication network, comprising:
one or more code generating devices (1), and
one or more code processing and recognising devices (4, 5),
wherein at least one of said one or more code generating devices (1) and/or at least one of said one or more code processing and recognising devices (4, 5) comprises at least one optical device (6) adapted to generate and process optical codes at at least one wavelength, comprising P inputs s, with $1 \leq s \leq P$, and $P \geq 1$, and N outputs k, with $1 \leq k \leq N$ and $N \geq 1$, wherein the network is adapted to simultaneously generate and process $N_c$ phase and/or amplitude optical codes at one or more wavelengths, with $N_c \geq 2$, made of C chips with time interval τ, with $C \geq 2$, and a transfer function $T_{sk}(f)$ from the input s to the output k satisfies the following formula:

$$|T_{sk}(f)| = \prod_{v=0}^{V-1} \left| F_v \left( a_v f + \frac{S_{sk}}{N_k \tau} \right) \right|, \quad \text{for } s = 1, 2 \ldots P \ k = 1, 2, \ldots N$$

where:
$F_v(f)$ is a transfer function of an optical filter, for $v = 0, 1, \ldots, V-1$,
$a_v$ is a constant value, for $v = 0, 1, \ldots, V-1$,
$S_{sk}$ is an integer number ($S_{sk} \epsilon Z$),
$N_k$ is a constant value, for $k = 1, 2, \ldots N$, and
V is a positive integer number with $1 \leq V \leq \log_2 N$.

34. The communication network according to claim 33, wherein said at least one optical device (6) is included within at least one of said one or more code generating devices (1) for associating at least one optical code (2) to one or more information optical signals (3).

35. The communication network according to claim 33, wherein said at least one optical device (6) is included within at least one of said one or more code processing and recognising devices (4, 5) for controlling at least one optical switcher (13) on the basis of at least one recognised optical code (2).

36. The communication network according to claim 35, wherein said at least one of said one or more code processing and recognising devices (4, 5) within which said at least one optical device (6) is included is a router device.

37. The communication network according to claim 33, wherein the communication network is a Multi Protocol Label Switching or MPLS communication network.

38. The communication network according to claim 33, wherein the communication network is a Code Division Multiple Access or CDMA communication network.

39. A code generating device (1), comprising:
an optical device (6) adapted to generate and process optical codes at at least one wavelength, comprising P inputs s, with $1 \leq s \leq P$, and $P \geq 1$, and N outputs k, with $1 \leq k \leq N$ and $N \geq 1$, wherein the device is adapted to simultaneously generate and process $N_c$ phase and/or amplitude optical codes at one or more wavelengths, with $N_c \geq 2$, made of C chips with time interval τ, with $C \geq 2$, characterised in that the transfer function $T_{sk}(f)$ from the input s to the output k satisfies the following formula:

$$|T_{sk}(f)| = \prod_{v=0}^{V-1} \left| F_v \left( a_v f + \frac{S_{sk}}{N_k \tau} \right) \right|, \quad \text{for } s = 1, 2 \ldots P \ k = 1, 2, \ldots N$$

where:
$F_v(f)$ is a transfer function of an optical filter, for $v = 0, 1, \ldots, V-1$,
$a_v$ is a constant value, for $v = 0, 1, \ldots, V-1$,
$S_{sk}$ is an integer number ($S_{sk} \epsilon Z$),
$N_k$ is a constant value, for $k = 1, 2, \ldots N$, and
V is a positive integer number with $1 \leq V \leq \log_2 N$,
the code generating device being apt to be used in a communication network comprising one or more code generating devices (1), and one or more code processing and recognising devices (4, 5).

40. A code processing and recognising device (4, 5), comprising:
an optical device (6) configured for controlling at least one optical switcher (13) on the basis of at least one recognised optical code (2), optical device (6) being adapted to generate and process optical codes at at least one wavelength, comprising P inputs s, with $1 \leq s \leq P$, and $P \geq 1$, and N outputs k, with $1 \leq k \leq N$ and $N \geq 1$, wherein the device is adapted to simultaneously generate and process $N_c$ phase and/or amplitude optical codes at one or more wavelengths, with $N_c \geq 2$, made of C chips with time interval τ, with $C \geq 2$, and a transfer function $T_{sk}(f)$ from the input s to the output k satisfies the following formula:

$$|T_{sk}(f)| = \prod_{v=0}^{V-1} \left| F_v \left( a_v f + \frac{S_{sk}}{N_k \tau} \right) \right|, \quad \text{for } s = 1, 2 \ldots P \quad k = 1, 2, \ldots N$$

where:
$F_v(f)$ is a transfer function of an optical filter, for $v = 0, 1, \ldots, V-1$,
$a_v$ is a constant value, for $v = 0, 1, \ldots, V-1$,
$S_{sk}$ is an integer number ($S_{sk} \epsilon Z$),
$N_k$ is a constant value, for $k = 1, 2, \ldots, N$, and
V is a positive integer number with $1 \leq V \leq \log_2 N$,
the code processing and recognising device (4, 5) being adapted to be used in a communication network comprising one or more code generating devices (1), and one or more code processing and recognising devices (4, 5).

41. The code processing and recognising device (4, 5) according to claim 40, wherein the device is a router device.

* * * * *